(12) United States Patent
Brown

(10) Patent No.: US 7,618,016 B2
(45) Date of Patent: Nov. 17, 2009

(54) EQUIPOISING SUPPORT APPARATUS

(76) Inventor: Garrett W. Brown, 515 Addison Ct., Philadelphia, PA (US) 19147

( * ) Notice: Subject to any disclaimer, the term of this patent is extended or adjusted under 35 U.S.C. 154(b) by 265 days.

(21) Appl. No.: 11/403,731

(22) Filed: Apr. 13, 2006

(65) Prior Publication Data
US 2006/0263082 A1  Nov. 23, 2006

Related U.S. Application Data

(60) Provisional application No. 60/672,186, filed on Apr. 15, 2005.

(51) Int. Cl.
*F16M 13/00* (2006.01)
*G03B 17/00* (2006.01)
*E04G 3/00* (2006.01)

(52) U.S. Cl. ............... 248/584; 248/281.11; 248/284.1; 352/243; 396/421; 224/185

(58) Field of Classification Search ................. 248/584, 248/585, 586, 591, 276.1, 281.11, 284.1; 396/420, 421; 352/248; 224/185
See application file for complete search history.

(56) References Cited

U.S. PATENT DOCUMENTS

| 218,210 | A | 8/1879 | Ailling et al. |
|---|---|---|---|
| 991,101 | A | 5/1911 | Smith |
| 1,040,575 | A | 10/1912 | Pieper |
| 1,070,525 | A | 8/1913 | Pieper |
| 1,246,859 | A | 11/1917 | Boyd |
| 1,255,185 | A | 2/1918 | Lehmkuhl |
| 1,272,845 | A | 7/1918 | Peck et al. |
| 2,036,097 | A | 3/1936 | Pieper |
| 2,090,439 | A | 8/1937 | Carwardine |
| 2,131,693 | A | 9/1938 | Smith |
| 2,287,677 | A | 6/1942 | Slava |
| 2,447,667 | A | 8/1948 | Raby |
| 2,506,228 | A | 5/1950 | Lofstrand |

(Continued)

FOREIGN PATENT DOCUMENTS

DE         441 148         2/1927

(Continued)

OTHER PUBLICATIONS

International Search Report for PCT Patent Application No. PCT/US2006/014036, dated Oct. 4, 2007.

*Primary Examiner*—Anita M King
(74) *Attorney, Agent, or Firm*—Schnader Harrison Segal & Lewis LLP

(57) ABSTRACT

A force exerting device having a force exerting structure including a load arm as a first side, pivotable about a load pivot, a resilient member attached to the load arm and to a termination point and forming a second side of the force exerting structure. The third side of the structure is formed by a line from the termination point to the load pivot. A first adjustment mechanism moves the termination point to change the length of the third side of the structure. A second adjustment mechanism moves the termination point in a direction different than the first adjustment direction so the termination point location can cross a substantially plumb line passing through the load pivot. A force modification device may be included to dynamically adjust the resilient member termination point position in response to motion of the load arm.

17 Claims, 20 Drawing Sheets

U.S. PATENT DOCUMENTS

| | | | |
|---|---|---|---|
| 2,552,205 A | 5/1951 | Moss | |
| 2,700,524 A | 1/1955 | Lauterbach | |
| 2,787,424 A | 4/1957 | Jacobsen | |
| 2,833,504 A | 5/1958 | Sacksteder | |
| 2,901,202 A | 8/1959 | Stava | |
| 2,911,525 A | 11/1959 | Strom | |
| 3,041,060 A | 4/1960 | Jacobsen | |
| 3,226,073 A | 12/1965 | Jacobsen et al. | |
| 3,396,931 A | 8/1968 | Eckstein | |
| 3,409,261 A | 11/1968 | Leporati | |
| 3,417,953 A | 12/1968 | Hillquist et al. | |
| 3,543,019 A | 11/1970 | Jacobsen | |
| 3,599,232 A * | 8/1971 | Tabor | 248/567 |
| 3,774,873 A | 11/1973 | Krogsrud | |
| 3,995,797 A | 12/1976 | Knight | |
| 4,017,168 A | 4/1977 | Brown | |
| 4,156,512 A | 5/1979 | Brown | |
| 4,158,488 A | 6/1979 | Gottschalk | |
| 4,158,489 A | 6/1979 | Gottschalk | |
| 4,158,490 A | 6/1979 | Gottschalk | |
| 4,206,983 A | 6/1980 | Nettman | |
| 4,208,028 A | 6/1980 | Brown | |
| 4,394,075 A | 7/1983 | Brown et al. | |
| 4,447,031 A * | 5/1984 | Souder et al. | 248/281.11 |
| 4,523,732 A | 6/1985 | Biber et al. | |
| 4,591,122 A | 5/1986 | Kreuzer | |
| RE32,213 E | 7/1986 | Brown | |
| 4,976,387 A | 12/1990 | Spianti | |
| 5,037,053 A | 8/1991 | Fox et al. | |
| 5,042,763 A | 8/1991 | Wong | |
| 5,213,293 A | 5/1993 | Muentener et al. | |
| 5,340,072 A | 8/1994 | Halbirt | |
| 5,360,196 A | 11/1994 | Di Giulio et al. | |
| 5,435,515 A | 7/1995 | Di Giulio et al. | |
| 5,609,316 A | 3/1997 | Tigliev | |
| 6,030,130 A | 2/2000 | Paddock et al. | |
| 713,177 A1 | 11/2002 | Thomsen | |
| 6,523,796 B2 | 2/2003 | Abramowsky et al. | |
| 6,575,644 B2 * | 6/2003 | Paddock et al. | 396/421 |
| 6,896,230 B2 | 5/2005 | Cvek | |
| 2003/0117703 A1 | 6/2003 | Metelski | |
| 2005/0023422 A1 | 2/2005 | Oddsen, Jr. | |
| 2007/0080275 A1 * | 4/2007 | Stachowski et al. | 248/323 |

FOREIGN PATENT DOCUMENTS

| | | |
|---|---|---|
| DE | 1 179 070 | 10/1964 |
| FR | 2 359 361 | 2/1978 |
| FR | 2 380 492 | 9/1978 |
| GB | 1136867 | 12/1968 |
| GB | 2 021 800 A | 12/1979 |
| IT | 428 441 | 12/1947 |
| SU | 691797 | 7/1977 |
| WO | WO 88-06695 | 9/1988 |

* cited by examiner

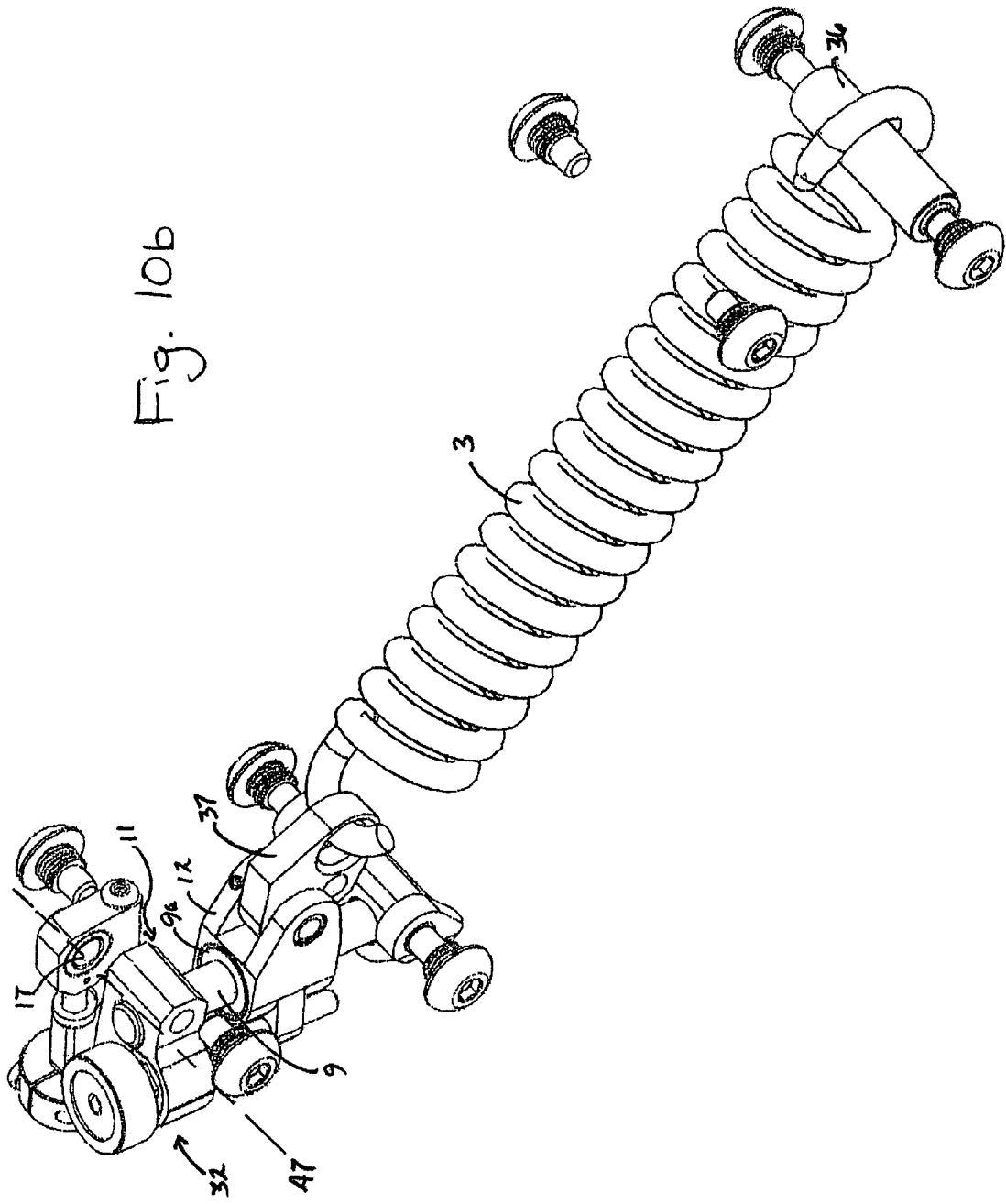

EQUIPOISING SUPPORT APPARATUS

This application is based on, and claims priority to, provisional application Ser. No. 60/672,186, having a filing date of Apr. 15, 2005, and entitled, Auto Adjusting Equipoising Support Apparatus.

BACKGROUND OF THE INVENTION

This invention relates generally to equipment supports, and more particularly to portable equipment utilized in conjunction with motion picture or video cameras.

Mobile film or video cameras typically require angular and spatial stability in order to obtain smooth, high-quality results. The Steadicam® portable camera stabilizing device, which has become a de facto standard in the TV and movie industry, was developed to permit stable ambulatory videography or cinematography by an operator. The inventor's U.S. Pat. No. 4,017,168 (Re. 32,213), U.S. Pat. Nos. 4,156,512 & 4,474,439 are directed to aspects of such stabilizing devices.

Spring powered 'equipoising' parallelogram arms have been used for decades to support and position payloads such as lamps, x-ray machines and dental equipment. These arms rely to a greater or lesser extent on friction to retain a set angle or position, since existing spring geometries do not necessarily provide appropriate or consistent lift throughout the entire angular excursion of the parallelogram links. The Steadicam®, however, provides near frictionless support of the floating camera payload in order to isolate a camera from unwanted spatial movements of the operator, and further mandates a spring design for the support arm that will equipoise almost perfectly, that counters the fixed weight of the gimbaled camera assembly with nearly constant positive buoyancy from its lowest to its highest point of parallelogram excursion The formulas for determining the appropriate spring rate to achieve this in equipoising arms factor down to the expression $K=P/d$, where K is the spring rate, P is the load and d is the height of the lifting triangle, which is incorporated into the parallelogram and exercises it upward. When a spring of the rate specified in the above formula is deployed as a side of the triangle, it produces the appropriate force to exactly lift the specified weight throughout the entire vertical range of motion. This property is termed "iso-elasticity".

It is noted that any shaped lifting structure can be used that follows the principals described herein and can be substituted for the "lifting triangle" referenced extensively throughout. It is also noted that reference to a triangle or structure sides does not necessarily mean the sides are physical structures.

In order to lift the load consistently throughout the entire excursion of the typical parallelogram arm, however, spring rate indicated by the above formula mandates spring designs that are typically up to three times as long as the diagonals across which they are to act. The present inventor's U.S. Pat. Nos. 4,208,028 and 4,394,075 originally solved this problem by dividing the spring into a chain of three spring segments in series, interconnected by steel cables running over pulleys at the parallelogram link ends, that permitted the entire spring to expand and contract, and yet still applied the sum of the collective force in series across the diagonal, as if produced by a single, continuous spring.

In practice it was found that when the support of lighter cameras required relaxing the tension of the spring series, the spring rate became inappropriate for those reduced loads and iso-elasticity was compromised. As a consequence, the arm tended to 'ride' harshly and the desired positive buoyancy for the load only prevailed in one sector of its vertical excursion.

Further, this three-spring solution was complex and expensive, requiring a plurality of pulleys and robust cables.

The present inventor's U.S. Pat. No. 5,360,196 (the '196 patent) describes an arm that is powered by a single, high-rate spring, applying its force via a differential pulley and tackle through a cable running across the diagonal, so that the effective rate is appropriate for iso-elasticity according to the above formula. This arm adjusts the lifting strength of the arm in a novel manner by raising and lowering the attachment point of the spring cable within the parallelogram linkage (thus increasing or decreasing the height, and thus the efficiency, of the lifting triangle) without compromising the spring rate required to provide 'iso-elasticity'. The same formula, $K=P/d$, indicates that if only the height of the appropriate lifting triangle is increased or reduced proportionately with the weight to be carried, the property of iso-elasticity will be maintained. In practice, the arm embodying the technology claimed in the '196 patent was found to be somewhat frictional due to the 'gear ratio' of the differential pulley. Also, the closer iso-elasticity was achieved, the more erratic was the arm's behavior at the extremes of high and low lifting position. As the lifted or depressed angle of an equipoising support arm exceeds 50° from the horizontal, its exact performance is increasingly subject to minute variations of load, torque, friction and the collective bearing tolerances of its pivots.

The present inventor's continuation of the above patent, U.S. Pat. No. 5,435,515 (the '515 patent), reverted to the complex and expensive 'three-spring' method to achieve iso-elasticity, but sought to achieve predictable performance at the high and low extremes of excursion by selectably decreasing the lifting efficiency of the spring geometry. This was done by adjustably offsetting the path of spring termination so that it was raised and lowered along a line within the parallelogram that was angularly displaced from vertical in order to slightly reduce the degree of iso-elasticity. The angle of the line was fixed, however, and since only its lateral displacement could be adjusted, its effect inappropriately increased rather than decreased the lifting efficiency where it was most needed—as the spring termination point was lowered.

What was needed was a means that would permit the use of a single spring that could actually fit within the diagonal distance of a support arm parallelogram and still produce iso-elastic equipoising of the load. An arm was also needed that would predictably, frictionlessly, equipoise the load throughout its entire excursion—all the way from its lowest to its highest parallelogram positions.

All previous Steadicam®-type arms, particularly those that approach iso-elasticity under certain loads, have needed to arbitrarily restrain their vertical travel to a degree of parallelogram excursion well short of maximum or minimum in order to avoid unruly, unpredictable performance at extreme high and low angles. Even with a degree of control over iso-elasticity, parallelogram arms were still prone to unexpected and forcible closure as angles neared 60° above or below horizontal. Arms would typically be characterized as those that 'behaved' and those that arbitrarily 'locked up' at those high and/or low excursions.

Restraining 'bumpers' have, therefore, been a feature of these equipoising arms from the beginning. The more 'iso-elastic' the spring geometry, the more irregularly the arms tend to lift at these vertical extremes of excursion. This is partly a consequence of the unpredictably varying torques imposed by the cantilevered, gimbaled payloads that hang at various angular positions relative to the arm parallelogram. The result has been an uncontrollable tendency to lock up, or lurch 'over-centers', at the high or low position, and so various bumper designs have, in some cases, restrained the travel to as little as 45° above level. In no case were the angular extremes of lift available from such parallelograms, and thus the lifting range of travel of the arms was curtailed. In addition, bumpers "bumped" more or less suddenly and further caused operators to be wary of approaching them—which further limited the usefulness of these support arms. What was needed was practical control of the general level of iso-elasticity, and further, some additional automatic control over the geometrical contour of lift that would provide smooth, predictable behavior at these extreme high-low angles of arm excursion, by gently de-powering the arms just before bumping, clunking or shooting over centers and locking up.

Applicant has previously refined the 'offset' concept described in the '515 patent, and placed it fixedly 'outside' vertical to, in effect, uniformly change the effective rate throughout the arm's excursion and simulate the effect of the correct rate using a spring short enough to fit into the diagonal (this concept has been successfully marketed as the 'Flyer' arm). Limitations in the Flyer arm, however, were evident at extremes of high lift. There was also an irregular curve of performance.

Parallelograms are capable of closing to nearly ±80°, but have previously been unusable at those angles due to the foregoing problems, despite various bumper schemes employed to tame these extreme up/down positions.

What is further needed is a way to regularize and level out the lifting curve and avoid the tendency to jump 'over centers' and lock up at high/low extremes.

SUMMARY OF THE INVENTION

The present invention is directed to the field of parallelogram equipoising support arms for camera stabilizing devices. Illustrative embodiments of the invention comprise a tensioning assembly that can provide two different fixed adjustments and one automatic, preferably eccentric, adjustment to the geometric relationship between the end point of the tensioning assembly and the remaining structures that comprise the support arm, in order to provide a consistent lifting force by means of a resilient member of appropriate dimension but not necessarily appropriate 'spring rate'. The adjustments can include altering the elevation of the tensioning assembly termination and/or its lateral relationship with reference to the structure. The automatic adjustment can include cyclical further alteration of the lateral relationship in response to movement of the parallelogram through its excursion.

In a first, aspect of an illustrative embodiment of the invention, a force-exerting and/or lifting triangle, which provides the lifting power for the support arm, comprises a long side and a short side pivotally connected at a variable angle, with a resilient member pivotally forming another side of the triangle so as to bias the angle appropriately for the purpose of equipoising the payload. The efficiency of the lifting triangle can be improved in two ways: 1) by pivoting the short side of the lifting triangle to a optimal offset angle with reference to vertical and 2) by an additional, dynamic angular alteration of the verticality in response to the raising or lowering of the long side of the lifting triangle.

Another exemplary embodiment of the invention provides for selectably raising and lowering the terminal points of the resilient member along the line of the pivoting short side of the lifting triangle in order to increase or decrease the load that is equipoised. The length of the pivotable short side will thus be lengthened or shortened progressively along the angle that is the sum resulting from adjustments 1 and 2 above.

A further illustrative embodiment of the invention provides for the arcuate adjustment of the short side in reference to a plumb line through the apex of the triangle, so as to alter the effective rate, and thus the lifting efficiency, of the resilient member in order to lift consistently, even though the resilient member may be of an inappropriate spring rate.

A further illustrative embodiment of the invention, includes an arcuate adjustment that is additionally dynamically varied with reference to the plumb line by cams or linkages directly or indirectly actuated in reference to the pivoting of the long side of the triangle at the apex.

In a particular illustrative embodiment of the invention, alternatively the magnitude of the additional dynamic adjustment is controlled by either a selection of more or less circular cam sizes and shapes centered on a point fixedly or adjustably referenced to the long side of the lifting triangle. The amount of adjustment and the arm excursion position in which the adjustment takes place will be dependent primarily on the shape of the cam and the placement of the pivot point.

In a further embodiment of the invention, the magnitude of the additional dynamic adjustment is controlled by a crankshaft pivoting on a point fixedly or adjustably associated with the long side of the lifting triangle.

In a further embodiment of the invention the magnitude of the additional dynamic adjustment is controlled by a turnbuckle of selectable length pivoting on a point fixedly or adjustably associated with the long side of the lifting triangle.

In a further embodiment of the invention, chambered extrusions are employed to form parallelogram links and endblocks to provide maximum torsional stiffness with the lightest possible weight.

In a further embodiment of the invention, the provision of a novel turnbuckle design provides for the pivots to be closer together than possible with conventional turnbuckles and the adjusting knob to be displaced away from the line between the pivots, and thus out of the way of the end block as employed in embodiments of the present invention.

Embodiments of the invention provide ways to actively adjust the spring offset relative to the parallelogram position so that the lift is selectably appropriate throughout the range. Therefore, the simplest of bumpers at approximately ±70° range are sufficient to restrain and tame these most extreme excursions. (Previous arms have limited the range to as little as 55° to avoid this problem, which has caused a severe reduction in the lifting excursion, and thus of the usefulness of the arm to mimic the entire lifting range of the human arm (alongside which these arms operate), in order to relieve the operator of the weight of his or her equipment.

In an illustrative embodiment, the active adjustment of the spring offset is performed with a crank pivot axle approximately in line with a transverse link of the parallelogram and external to its adjacent pivot; and a crank arm, pivoting on the axle, that swings the bearing shaft toward and away from the interior of the parallelogram, but generally outside of the vertical line between the adjacent end pivots, so that the lifting efficiency of the resilient member is dynamically altered in response to the momentary angle of the parallelogram arm, from lowest to highest.

The crank can be a turnbuckle which provides combined iso-elasticity and lifting curve adjustment, simultaneously adjusting the spring termination offset and the aggressiveness of the cam effect for the 'active contouring' of the lifting force so that it is not excessive at high angles (which would lock up the arm) and not insufficient at low angles (which would likewise impel it 'over centers' and into a locked up condition).

Embodiments of the invention are directed to a lifting triangle operating in conjunction with a parallelogram support arm and comprising a substantially vertical shorter side, a longer side and another side that consists of a flexible, resilient member, the expansion or contraction of which pivotally biases the apex angle of the sides (and thus the associated parallelogram) from its most obtuse form, up past the condition of being a right angle and on up to its most acute form.

The long side of the lifting triangle can be contiguous with one of, or parallel to, the long sides of the parallelogram, The angle of the short side is preferably variably fixed in angular reference to the adjacent, roughly vertical, leg of the parallelogram (with reference to a plumb line that passes through the apex of the triangle), such that the degree of iso-elasticity is nominally acceptable, even though the selected rate of the resilient member does not conform to the $K=P/d$ formula for the iso-elasticity.

The angle of the 'short' leg with reference to vertical may be additionally, actively controlled, by means of cams, crankshaft linkages or the like, as the parallelogram arm is biased by the flexible resilient member. The dynamic control varies the position of the termination point of the resilient member so that the angle subtended by the short and long legs is reduced as the lifting triangle approaches both its most open and closed forms, as compared to the angle subtended when there is no dynamic control. This dynamic excursion of the effective termination point of the resilient member has the effect of actively varying the effective spring rate of the resilient member, and thus providing predictably consistent lifting ability as the hitherto-unusable extremes of parallelogram excursion are approached.

Further, the cyclical action of the cams or crankshaft linkages is arranged to be a selectably fixed dimension, so the dynamic adjustment of spring termination offset can be contoured more or less radically at the same time as the general level of iso-elasticity is set. In contrast to previous methods of altering iso-elasticity, intended to provide an overall harder or softer "ride", the dynamic means of embodiments of the invention additionally exaggerate the active increase and decrease of lift respectively as low and high positions of the lifting triangle are approached. In practice, when the lifting triangle is incorporated into a parallelogram support arm linkage, the effective center of the cam(s) or the pivot location of crankshaft(s) is conveniently referenced to and actuated by the top link as its angle parallels the 'long' leg of the lifting triangle throughout the excursion of the arm.

In a preferred embodiment of the present invention, the action of the cams or cranks can be plotted graphically as the degree of offset vs. the angular degree of arm excursion ($\pm 70$ degrees from horizontal), resulting in generally parabolic curves.

Embodiments of the invention provide an adjustable iso-elastic support arm for a camera stabilizing device which can make use of springs that do not have an appropriate rate (offset variably outside, as well as inside, the lifting triangle).

Embodiments of the invention also may provide an adjustable iso-elastic support arm for a camera stabilizing device which can actively provide for varying the contour of iso-elasticity established for the support arm, substantially independently of the adjustment for supporting cameras of different weights.

Embodiments of the invention provide the features described in the two paragraphs immediately above by including a support arm for the camera stabilizing device that comprises a parallelogram linkage that is biased upward by a unitary, extendable and retractable resilient member, one end of which may be selectably raised or lowered along a preferably curved member mounted with respect to a pivot that is preferably common with a pivot of the parallelogram. The resilient member termination path can be additionally, arcuately adjusted, both fixedly and dynamically by a cam, crankshaft linkage, or the like, so that the resilient member attachment point can be swung inwardly and outwardly with respect to a vertical parallelogram side so as to dynamically alter the effective lifting power of the resilient means. Irregular cam shapes are also contemplated and within the scope of the invention to more particularly contour the lifting profile to produce appropriate arm performance.

DESCRIPTION OF THE DRAWINGS

For further detail regarding embodiments of the support arms produced in accordance with the present invention, reference is made to the detailed description which is provided below, taken in conjunction with the following illustrations.

FIGS. 10a-b are partial isometric views of the mechanism of the illustrative embodiment of FIG. 9.

Figure 17:
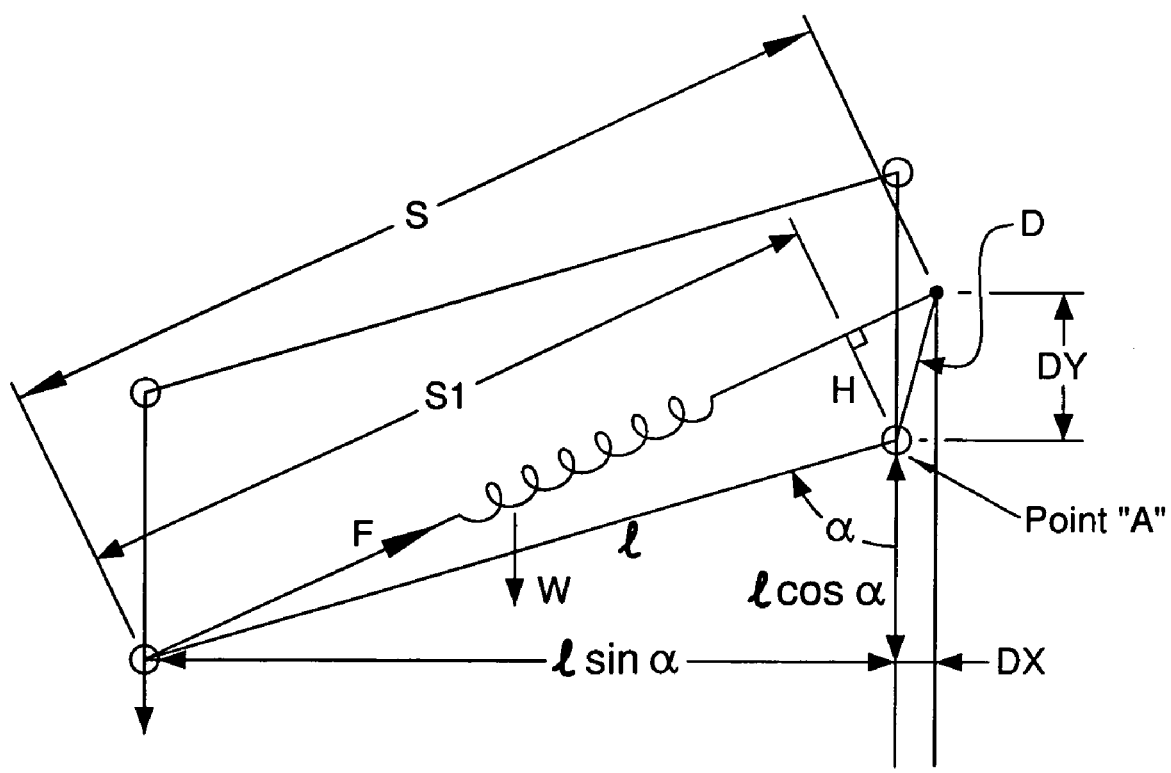

FIG. 17 diagrams the results of a graphical solution, given the stated crank link length and crank offset, for Dx, D, S, S1, H and P as defined, and shows the formulas employed according to an illustrative embodiment of the invention.

DETAILED DESCRIPTION OF THE PREFERRED EMBODIMENTS

Figure 1A:
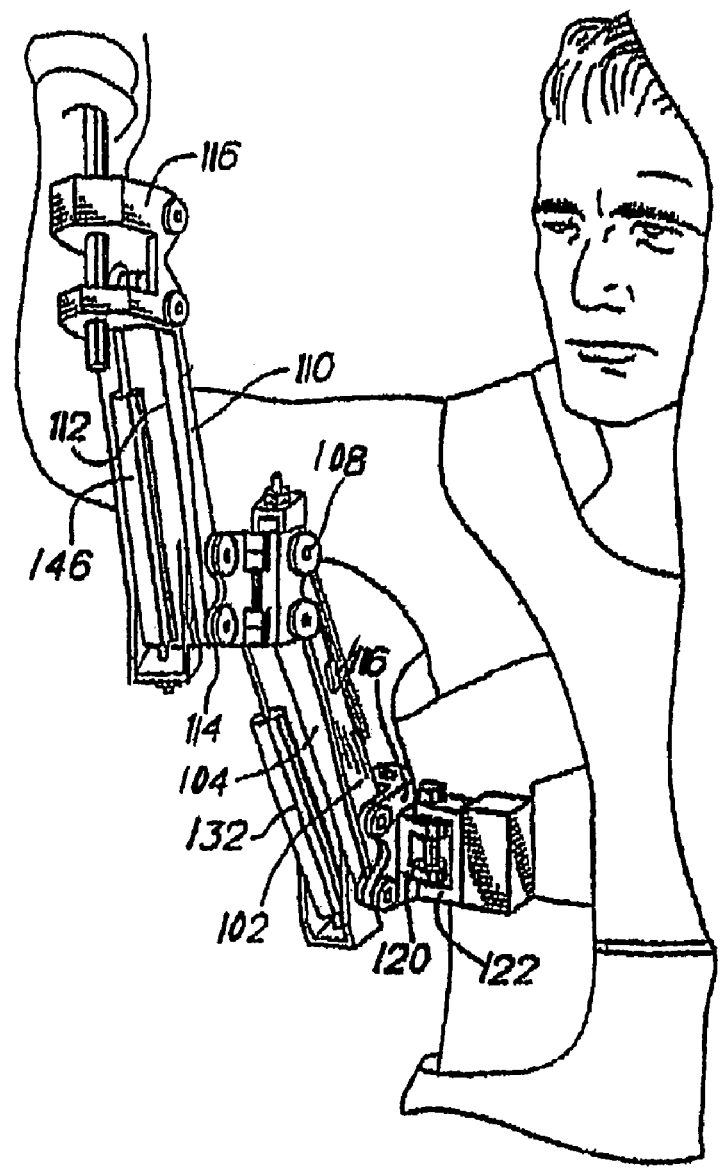
FIGS. 1a-b show a prior art support with three-spring arm sections.
Figure 1B:
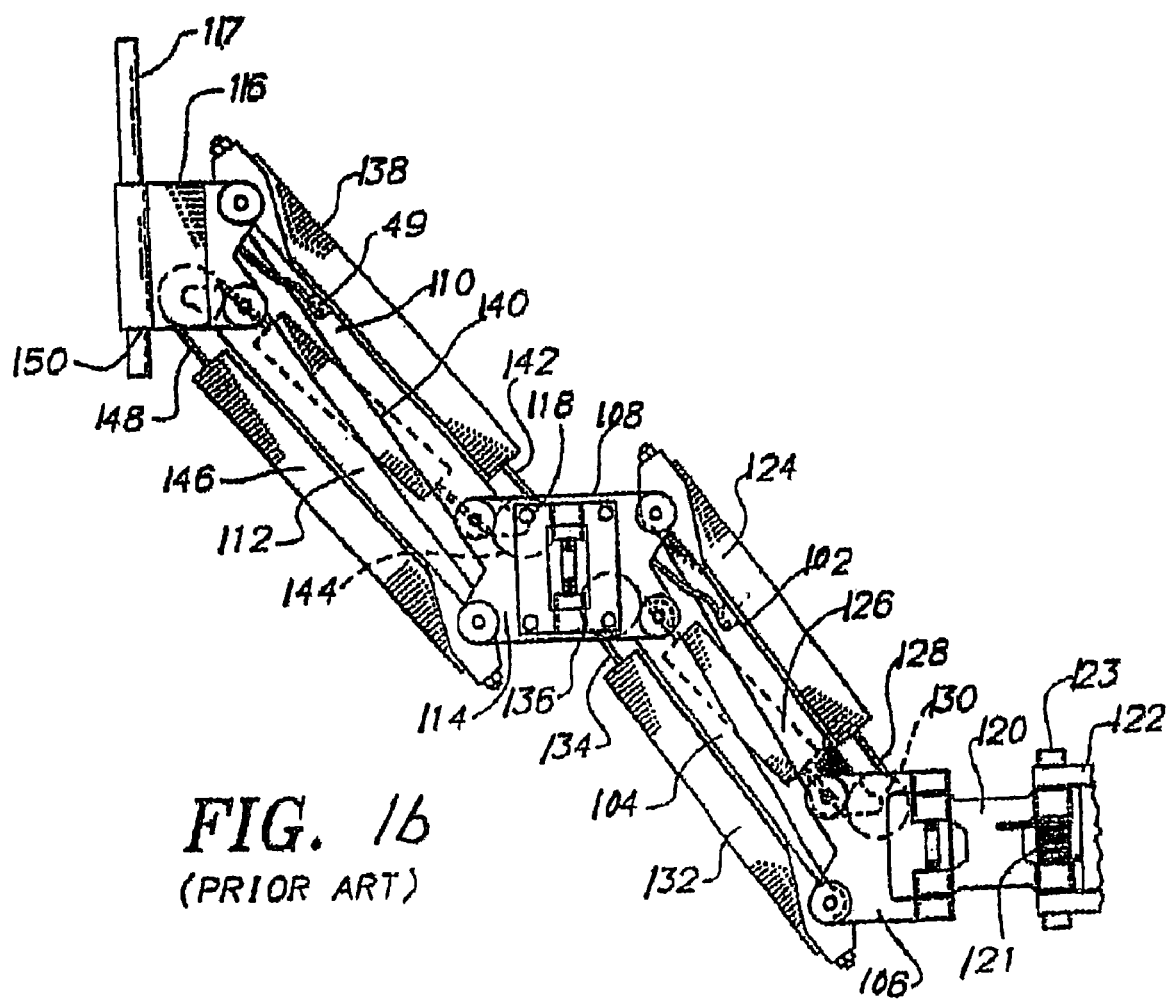
Figure 2:
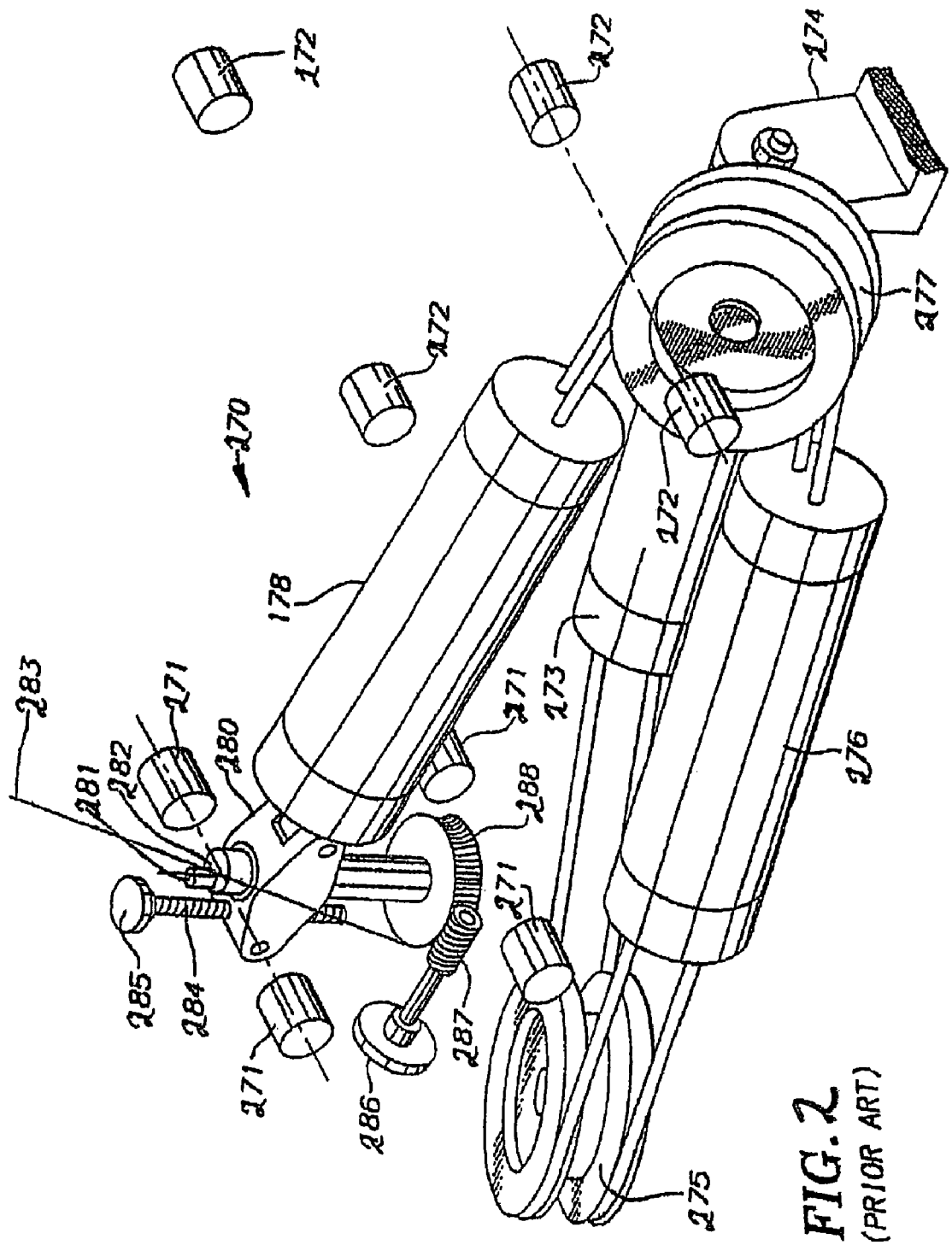
FIG. 2 illustrates the mechanism of the prior art three-spring arm with adjustable spring termination.

FIGS. 1a, 1b and 2 illustrate a support apparatus of the prior art, which the inventor originally devised to obtain stabilized motion picture film and video images and which was offered for sale under the trademark "Steadicam®". As illustrated, the support arm for the apparatus includes a pair of parallel upper arms links 102, 104, which are pivotally coupled at one end to a connector hinge bracket 106. The other ends of the upper arm links 102,104 are pivotally coupled to an upper arm medial hinge bracket 108. A second pair of parallel forearm links 110, 112 is pivotally coupled between a forearm medial bracket 114 and a camera support bracket 116. A camera mounting pin 117 is provided in the camera support bracket 116.

The upper arm medial bracket 108 and the forearm medial bracket 114 are rotatably coupled together along one side by a hinge 118. The connector hinge bracket 106 is rotatably coupled at its center to one end of a lower support hinge plate 120. The other end of the lower support hinge plate 120 is rotatably coupled to a fixed support block 122 by a pin 123. A spring 121, through which the pin 123 extends, biases the lower support hinge plate 120 in a clockwise direction.

One end of a tension spring 124 is coupled to the end of the upper arm link 102, which is pivotally coupled to the upper arm medial hinge bracket 108. The other end of the tension spring 124 is coupled to one end of the tension spring 126 by a section of cable 128 which rides on and around a pulley 130 which is rotatably coupled to the upper arm link 102. The other end of the tension spring 126 is coupled to one end of a tension spring 132 by a section of cable 134 which rides on and around a pulley 136 which is rotatably coupled to the upper arm link 104. The other end of the tension spring 132 is coupled to the end of the upper arm link 104 adjacent to the connector hinge bracket 106.

Similarly, one end of a tension spring 138 is coupled to the end of the forearm link 110 adjacent to the camera mounting bracket 116. The other end of the tension spring 138 is coupled to a tension spring 140 by a cable 142 which rides on and around a pulley 144 which is rotatably coupled to the forearm link 110. The other end of the tension spring 140 is coupled to one end of a tension spring 146 by a cable 148 which rides on and around a pulley 150 which is rotatably coupled to the forearm link 112. The other end of the tension spring 146 is coupled to the end of the forearm link 112 adjacent to the forearm medial hinge bracket 114.

A weight, such as a camera which is supported at the support bracket 116, behaves as an object in free space beyond gravity since the upward forces which the tension springs 124, 126, 132 and 138, 140, 146 exert, in effect, counteract gravity. The weight tends to travel in a straight line until influenced otherwise and tends to retain the same angle until influenced otherwise. As a result, the upper arm links 102, 104 roughly correspond to the upper arm of the user and the forearm links 110, 112 roughly correspond to the user's forearm, in terms of their three dimensional geometry, as the support arm is used either high, low, or to either side.

FIG. 2 illustrates the present inventor's more recent prior art. It shows a tensioning assembly 270 for implementing the required adjustments. To this end, a series of eight trunnions 271, 272 are schematically shown which define the bearing positions (the pivots) of the parallelogram structure of a support arm section (not shown for purposes of clarity). An end of a first spring segment 273 is fixedly connected to the lower link of the arm section, at 274. The opposite end of the first spring segment 273 is serially connected, through a pulley 275, with a second spring segment 276. The second spring segment 276 is serially connected, through an angled pulley 277, to a third spring segment 278. The third spring segment 278 terminates at a carrier block 280, which constitutes the point of origin.

The carrier block 280 is received by a pin 281, which interfaces with the carrier block 280 through a post 282. The eccentric pin 281 is preferably offset (e.g., by 5°) from a line 283 which vertically bisects a plane connecting the left-most trunnions 271. The carrier block 280 is driven along (up and down) the eccentric pin 281 by a lead screw 284. An adjustment knob 285 is provided to rotate the lead screw 284, and accordingly, to linearly vary the effective height of the point of origin of the tensioning assembly. Also provided is an adjustment knob 286, for rotating a worm 287. The worm operates to rotate a worm gear 288, which in turn operates to rotate the eccentric pin 281. This operates to laterally displace the path defined for the carrier block 280, suitably varying (displacing) the point of origin.

Figure 3:
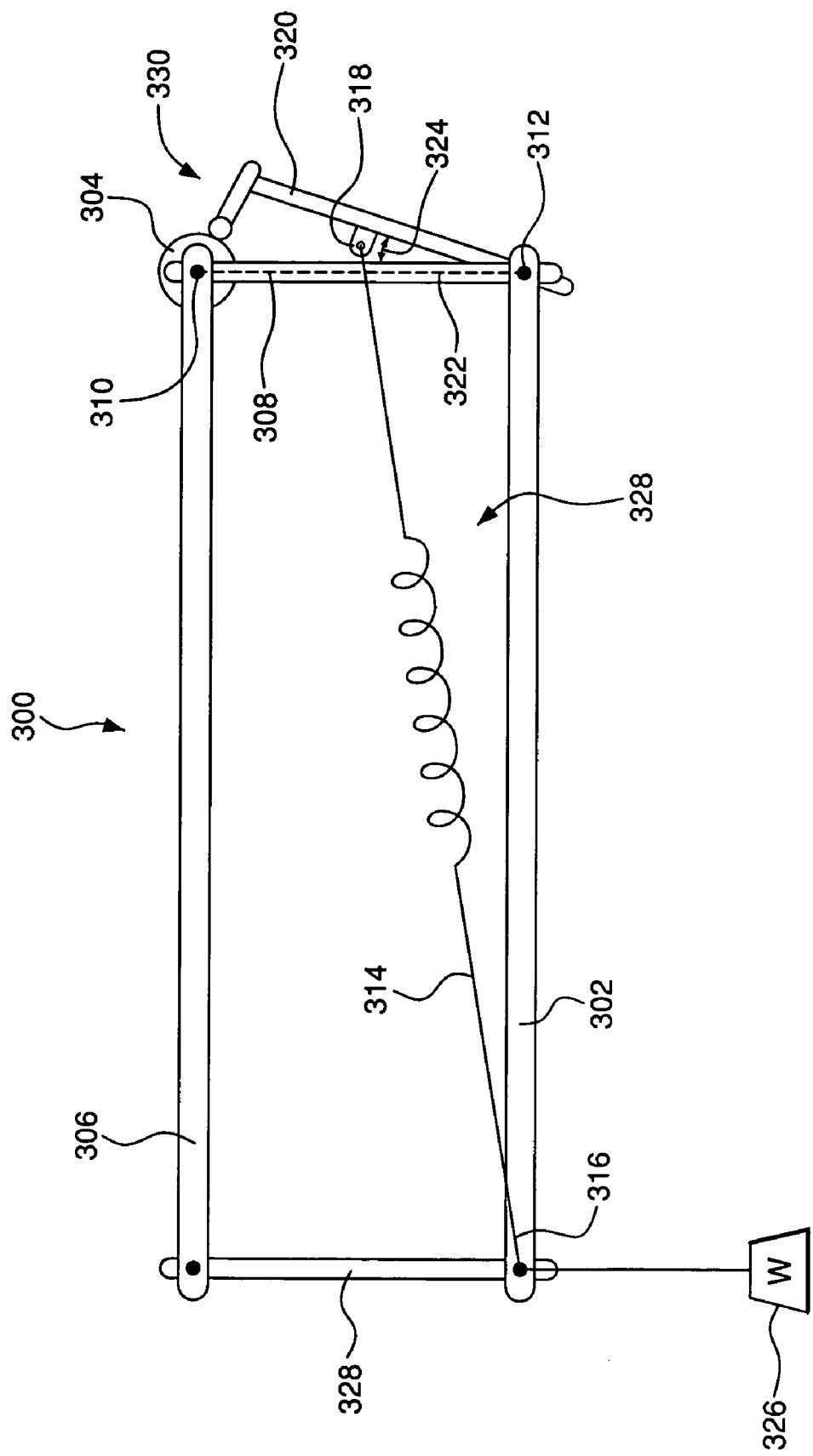
FIG. 3 is a diagram of a force exerting device according to an illustrative embodiment of the invention.

Embodiments of the invention permit equipoising of the load at far more oblique and far more acute angles than previously possible. In an illustrative embodiment shown in FIG. 3, this is accomplished by providing a force exerting device 300 having a load arm 302 pivotable about a load pivot 312 and forming a first side of a force exerting structure 328. Although the term "triangle" is often used herein, the actual shape of the force exerting structure can vary somewhat from a true triangular form, for example because of connecting components that may protrude from the triangular form, various attachment points or additional structural sides. A resilient member 314 having a first end 316 attached to the load arm and a second end is attached to a termination point 318, which is displaced from the load pivot 312 and forms a second side of the force exerting triangle. A third side 320 of the force exerting triangle extends from the termination point 318 to the load pivot 312. In this embodiment of the invention, the termination point can be adjusted in more than one direction. In an exemplary embodiment of the invention, a first adjustment mechanism moves the termination point 318 to change the length of the third side 320 of the force exerting triangle 328. A second adjustment mechanism moves the termination point in a direction other than the direction produced by the first adjustment. In an illustrative embodiment of the invention, the second adjustment direction is substantially perpendicular to the first adjustment direction. Examples of these two adjustment mechanisms are designated by Dx and Dy in FIGS. 5 and 7, although they need not be perpendicular as the "x" and "y" designations may imply. Optimum choice of the two adjustments allows the termination point 318 location to cross a substantially plumb line 322 that passes through the load pivot 312 as the load arm 302 pivots about the load pivot 312. This alters the equipoising contour throughout the pivotal excursion of the load arm as compared to prior art mechanisms in which the termination point did not cross the plumb line. It is noted that a single adjustment may be used to accomplish the same as two separate adjustment mechanisms. Additionally, a third adjustment mechanism can be included to move the termination point outside the plane of movement created by the other adjustment mechanism(s).

A turnbuckle or other threaded adjustment mechanism, may be used to produce at least one of the adjustments. Other adjustment mechanisms are within the spirit and scope of the invention. The adjustment amounts may be made in discrete increments or may span a continuous spectrum of values.

Another illustrative embodiment may provide additional equipoising ability by having a force modification device 304 functionally connected to the third triangle side 320 to produce dynamic movement of the termination point 318 in response to motion of the load arm 302 around the load pivot 312. The force modification device may be for example, a crankshaft or a cam. The force modification device causes the third side 320 of the force exerting triangle to move toward and away from plumb line 322 as load arm 302 moves. The amount termination point 318 moves, and where within load arm 302's excursion it moves, is controlled by the shape and position of the center point of the cam. Movement of the termination point in this manner puts it in different positions as compared to the prior art and causes resilient member 314's length and distribution of forces created by it to differ compared to the prior art, where the position of end 318 was not dynamically modified. These changes created by the force modification device enable the inventive support arm to behave in a more desirable manner at the extremes of the arm's excursion as compared to prior art arms. Equipoising of the load at far more oblique and far more acute angles is now possible.

It is noted that parts described as being "connected" to one another, include direct connections and indirect connections, such as where a coupling-type part or parts may be used.

As load arm 302 is swung through its excursion, such as upward or downward, resilient member 314 expands or contracts thereby changing the force it exerts at a particular rate. This rate can be modified by the force modification device at particular points along the excursion of load arm 302. The force modification device preferably decelerates this rate of change at the extremes of excursion, namely toward or near positive and negative 90°, thereby smoothing out the motion by reducing lockup, lurching etc. In a particular embodiment of the invention, the force modification device causes eccentric movement of the termination point, such as by use of an irregularly shaped cam.

The force exerting device may include a pivotal parallelogram structure wherein load arm 302 is a side of the parallelogram. Two such parallelograms can be pivotally connected to form a bendable or pivotable force exerting device. Non-parallelogram forms of the force exerting device may also be linked together.

The force exerting device may also have an attachment mechanism to attach load arm 302 to a movable carrier for operation as a portable device.

The fixed adjustment mechanisms may be motorized and may be computer controlled. The computer control system may include a program to control one or more of the adjustments in response to sensed input. One or more of the adjustment mechanisms may be manually controlled by a component displaced from the arm, such as a foot peddle.

The first and second adjustments may be computer controlled.

The invention also includes a method of exerting forces on objects. A force exerting device such as described herein is provided. The termination point is adjusted to change the length of the third side of the force exerting triangle to change the lifting power of the force exerting triangle. The termination point is further adjusted in a direction that is substantially perpendicular to the first adjustment direction so as the load arm pivots about the load pivot the termination point location can cross a substantially plumb line passing through the load pivot to alter the equipoising contour over at least part of the pivotal excursion of the load arm. In a particular embodiment of the invention, the method further includes adjusting the termination point so that the first and second adjustments are proportional. In yet another embodiment of the invention, the method further includes dynamically moving the termination point in response to motion of the load arm around the load pivot.

In further illustrative embodiments of the invention, the force exerting device has a dynamic termination point adjustment, but not necessarily the initial set point adjustments because in some applications this may not be necessary. For example, when the force exerting device is used in a particular product having a constant load, and to which no additional loads will be attached, the initial set points can be factory established, without the need for adjustment capabilities. Of course, one or more additional set point adjustment mechanisms can still be desirable and are within the scope of the invention. Generally, the force modification device will dynamically adjust the resilient member termination point position with respect to a substantially plumb line that passes through the load pivot based on motion of the load arm thereby varying the resilient member's exerted force. The dynamic adjustment may be eccentric such as described above. Other features described with respect to the embodiments having two initial termination point adjustments can be used with the dynamic adjustment feature, whether or not the initial termination set point adjustments are used.

Figure 4:
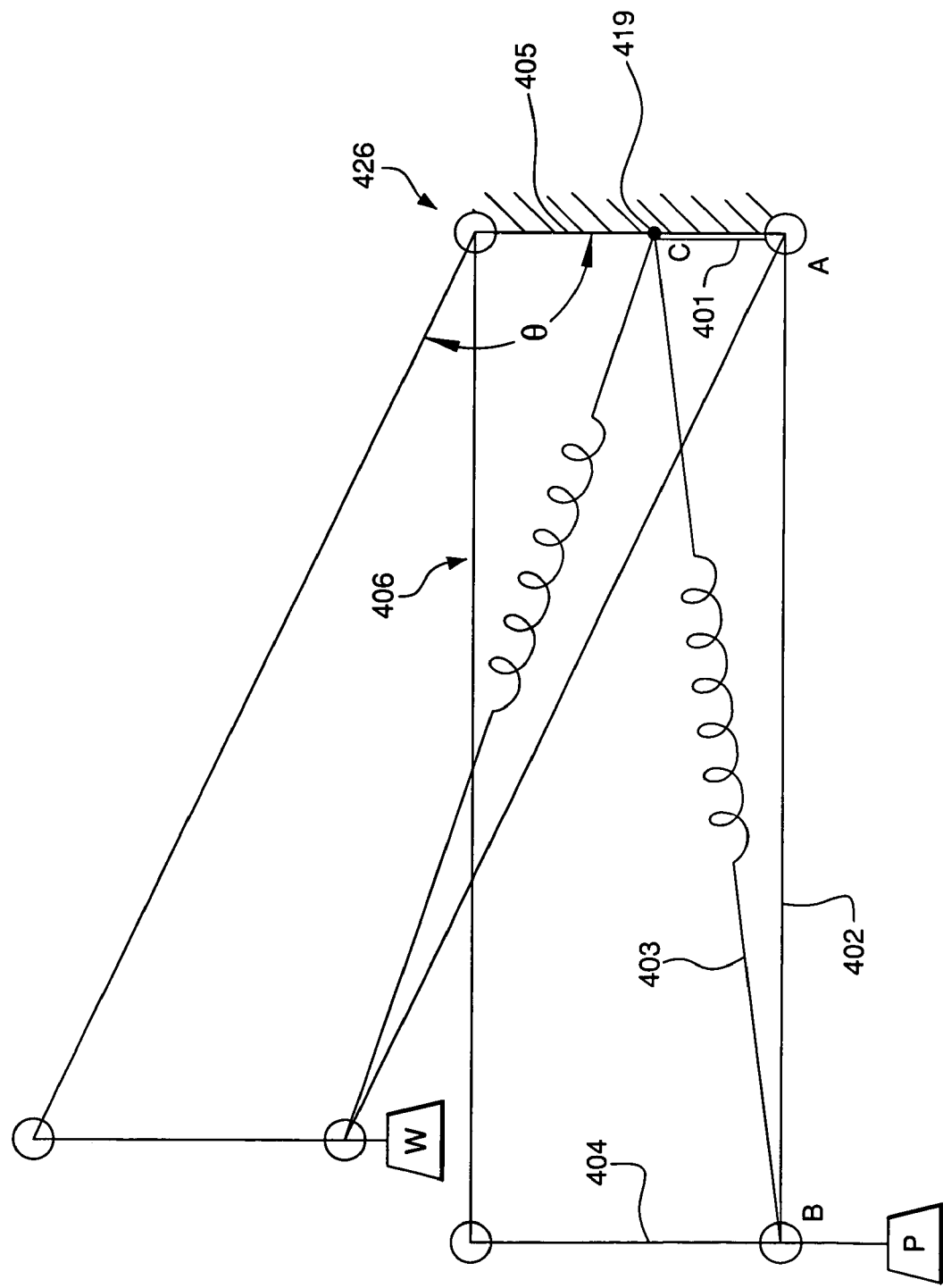
FIG. 4 diagrammatically shows the lifting triangle ABC incorporated within a parallelogram support linkage according to the prior art.

FIG. 4 diagrammatically shows two positions of the lifting triangle ABC incorporated within a parallelogram support linkage. Resilient member 403 forms a side of the force-exerting triangle, which is here shown as lifting triangle ABC. Resilient member 403 is here shown, therefore as a tension spring. In this illustration, side 401 is in both positions contiguous with fixed side 405 and the spring attachment point 419 is located on the line between point A and pivot 426. In order to exactly counter a weight throughout the potential excursion of parallelogram 402, 404, 405, 406 as shown, the tensioning assembly would require the spring rate specified by the formula K=P/Dy (where K=spring rate, P=load and Dy=height of side 401. The tension spring would only fit within the available diagonal distance BC as shown if an impractically high spring rate and an impractically low value for side 401 were employed. (example: If P=40 lbs a spring rate of 160 lbs/inch would exactly counter P if the length of side 401 was 0.25"). If the length of side 401 was increased, the weight of P would necessarily increase proportionately to remain in equilibrium with the lifting force of triangle ABC.

Figure 5:
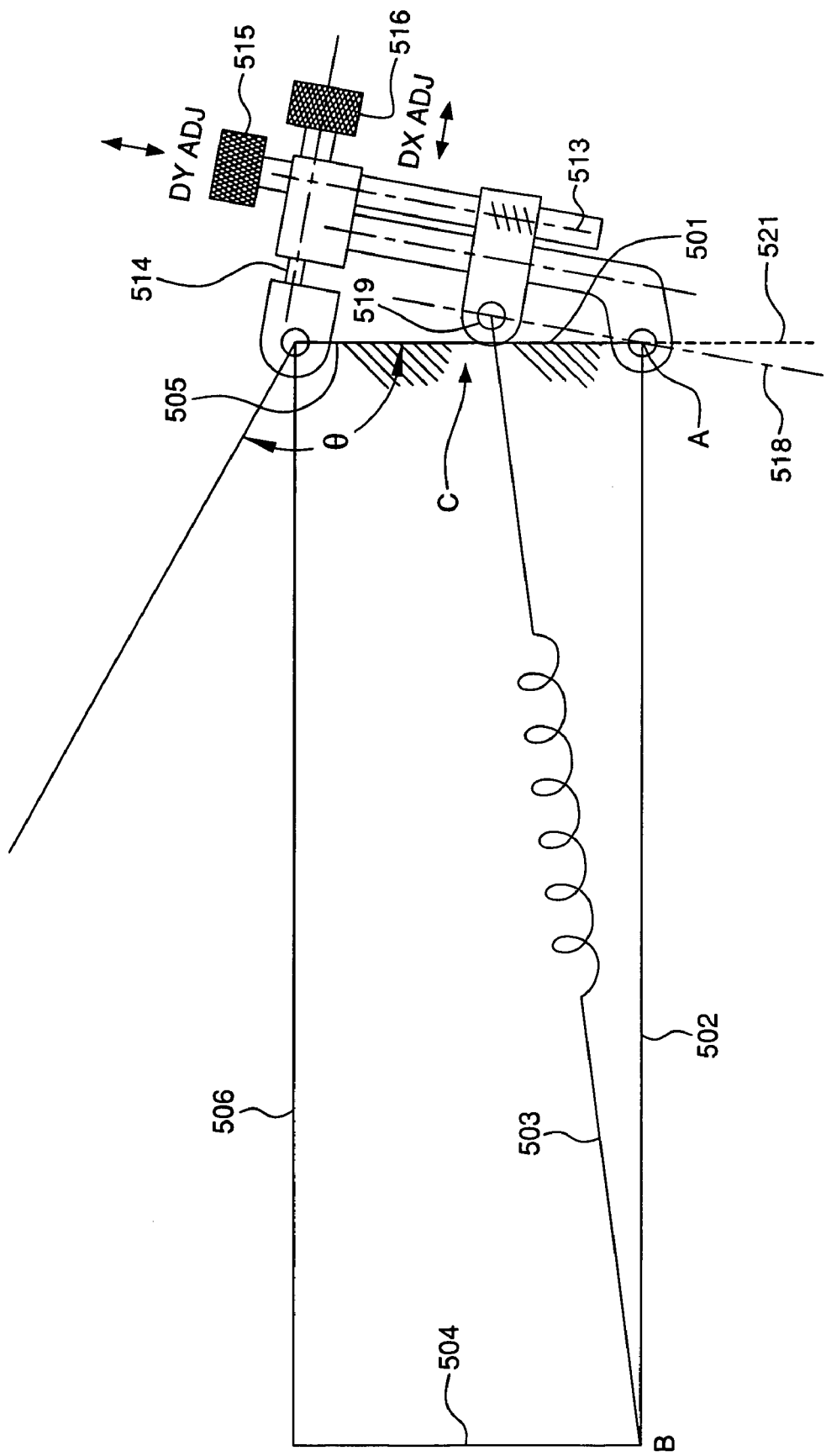
FIG. 5 diagrammatically defines DY and DX adjustments of the spring termination height and offset from vertical according to an illustrative embodiment of the invention.

FIG. 5 diagrammatically illustrates an exemplary mechanism to adjust spring termination height and offset from side 505, and further diagrams a novel way to equipoise load P using a tensioning assembly of a rate that is inappropriate according to the above formula K=P/Dy but is useful for other reasons. The tensioning assembly may, for example, be specified to fit within the diagonal space of a parallelogram without the high spring rate and low aspect ratio that would otherwise be called for. If the termination point 519 of spring 503 is displaced outside of the adjacent, side 505 of the parallelogram formed by sides 502, 504, 505 and 506, the lifting force becomes generally less efficient as the parallelogram is moved both upward and downward from the level attitude shown, and which is known in the art to provide an approximation of equipoise. Embodiments of the present invention introduce a mechanism to adjustably vary this offset in a manner that remains proportional to the changing height of the lifting triangle. The path 518 of potential spring termination points is angularly displaced from line 521, an extension of side 505, by means of Dx lead screw 514 which is adjusted by knob 516 to arcuately pivot side 501 (path 518) at pivot point A, and thus offset spring termination point 519 with respect to side 505, which is here shown to be vertical. In addition, Dy adjusting knob 515 turns lead screw 513 to raise and lower spring termination point 519 along spring termination path 518 in order to increase or decrease the lifting force of the triangle ABC.

Figure 6:
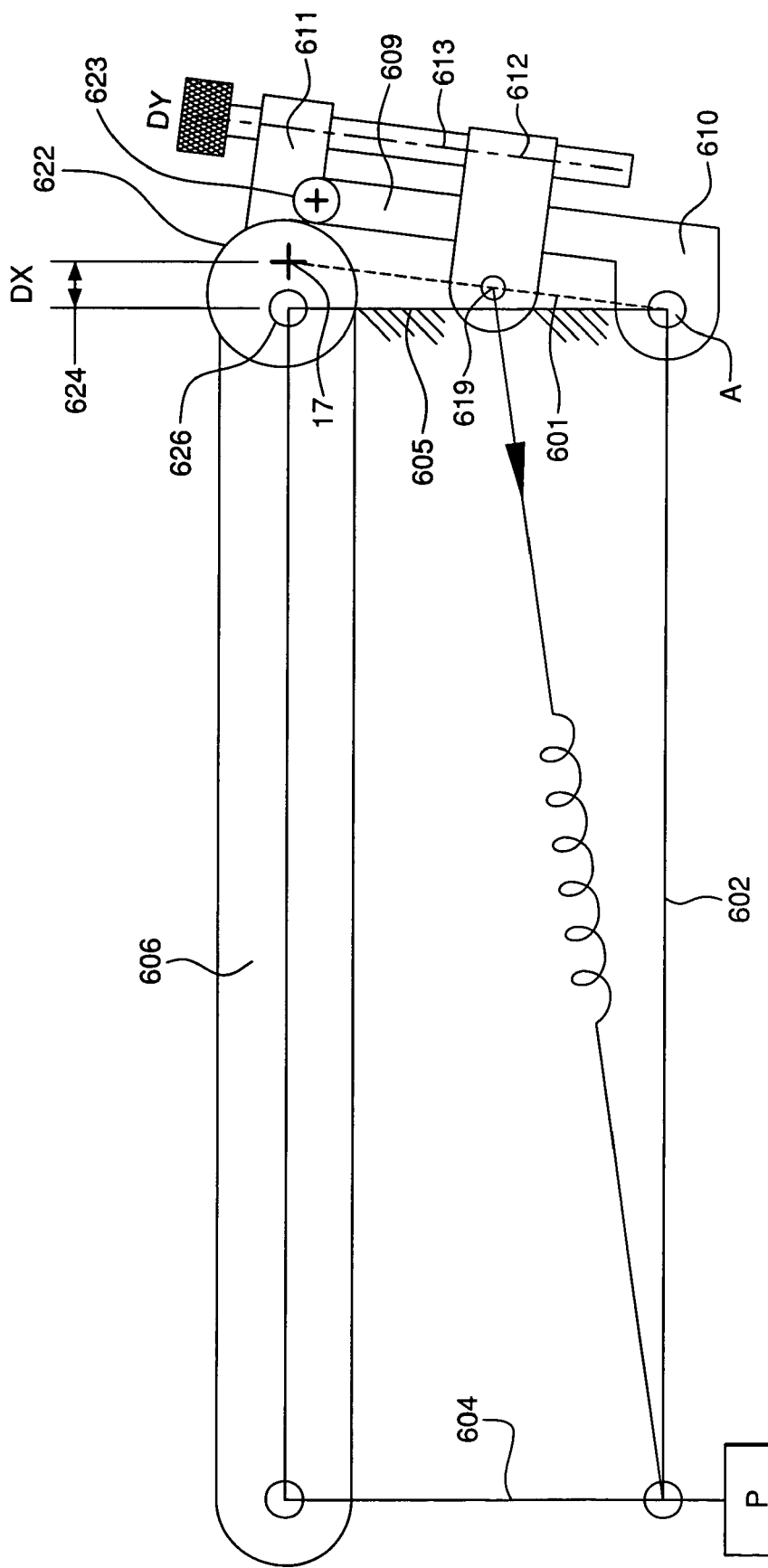
FIG. 6 diagrammatically illustrates the use of a cam with an offset center and a cam follower to dynamically alter DX in response to motion of the parallelogram (proportionally with the height of DY) according to an illustrative embodiment of the invention.

FIG. 6 diagrammatically illustrates an illustrative embodiment of the invention which introduces the use of a generally circular cam 622 and cam follower 623 to further equalize the force of the lifting triangle so that it may more closely equipoise the load at all values of angle Ø. To accomplish this, cam 622 is fixed to link side 606 with its center 617 offset from the fixed point and cam follower 623 is fixed to block 611. Block 611 is fixed to bearing shaft 609 which is adjustably fixed to spring carrier 612 by lead screw 613 in a manner to pivot with block 610 around point A so as to dynamically alter the momentary Dx offset 624 in response to excursion of the parallelogram (proportionally with the height of spring termination 619). (The line between 619 and point A defines side 601 of the lifting triangle, which is also the Dy distance.) The cyclical motion of the cam follower 623 in response to the excursion of the parallelogram (of sides 602, 604, 605, 606) from Ø20° up to 160° provides a series of Dx offsets that, if plotted against these angles is generally parabolic. (See FIG. 16 and FIG. 17 for diagrammatic and formulaic descriptions of this aspect of embodiments of the invention.) The larger the distance between the parallelogram pivot 626 and the cam center 617, and the smaller the general radius of the cam shape, the steeper the plotted parabola, and therefore the more radical the cam effect on Dx offset 624 as the parallelogram approaches the high and low positions of the angle Ø which may be as great as from 20° to 70°, which have hitherto been virtually uncontrollable with respect to predictably equipoising load P. It is noted that although the arm is shown in the figures with the resilient member above the arm, the entire apparatus can be inverted.

Figure 7:
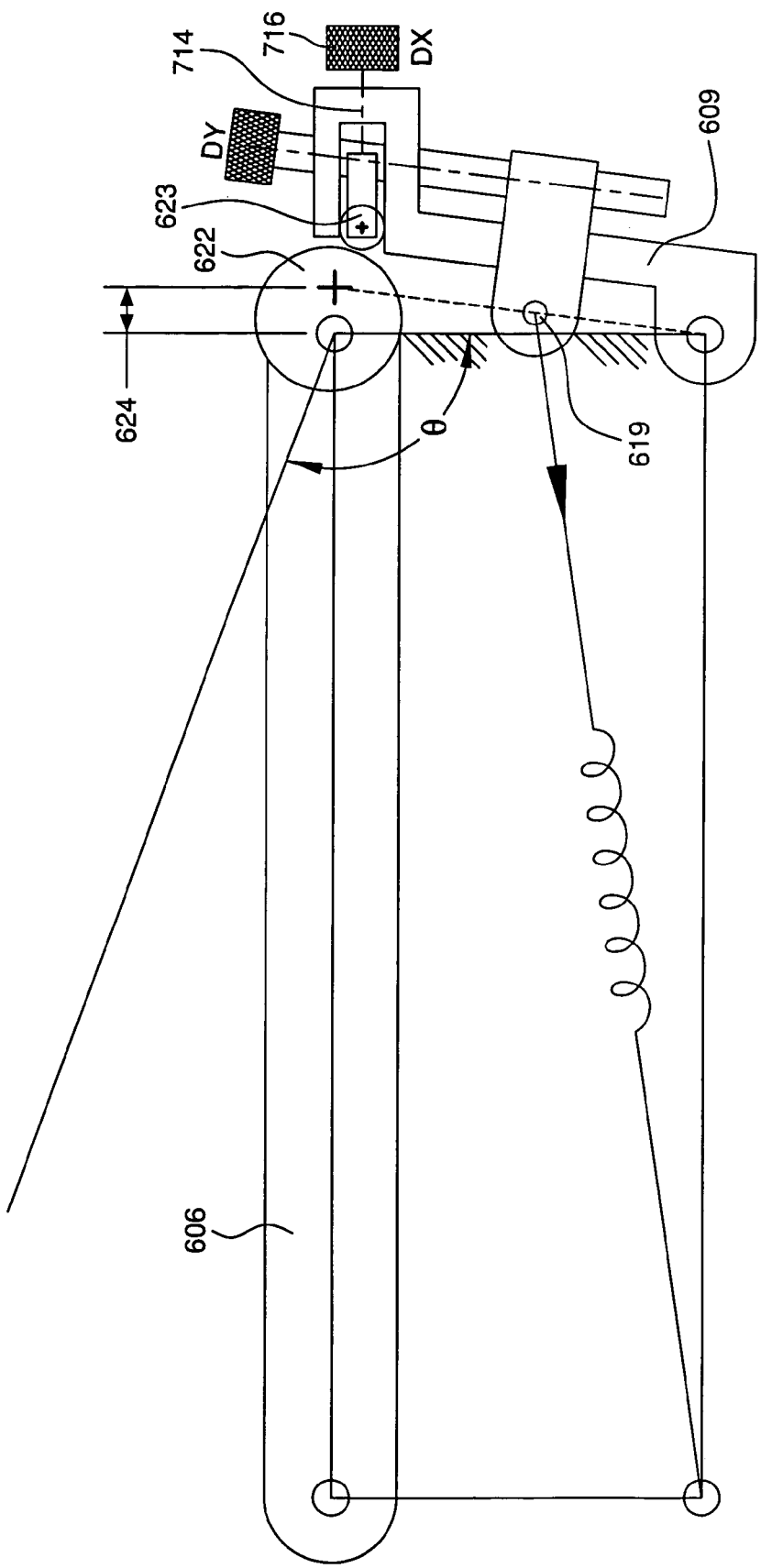
FIG. 7 illustrates the cam of FIG. 6 with the addition of a variable value for DX according to an illustrative embodiment of the invention.

FIG. 7 illustrates another embodiment of the present invention that adds to the effect of cam 622 of FIG. 6, a variable value for Dx (the effect of which is preferably proportional to the height of Dy). Dx adjusting knob 716 turns Dx lead screw 714 to adjustably position cam follower 623 with reference to bearing shaft 609 and thus set the value of offset 624 of spring termination 619, which is also momentarily incremented or decremented by the action of cam 622 driven by the excursion of side 606 of the parallelogram in angle Ø.

Embodiments of the invention control the behavior of the arm at high/low extremes (such as ±70°) so that typical problems such as lurching over centers and locking up may be solved by simply shortening the crank length. This simultaneously reduces the offset and increases the radicality of the cam effect to reduce Dx as the arm approaches ±70°.

Figure 8A:
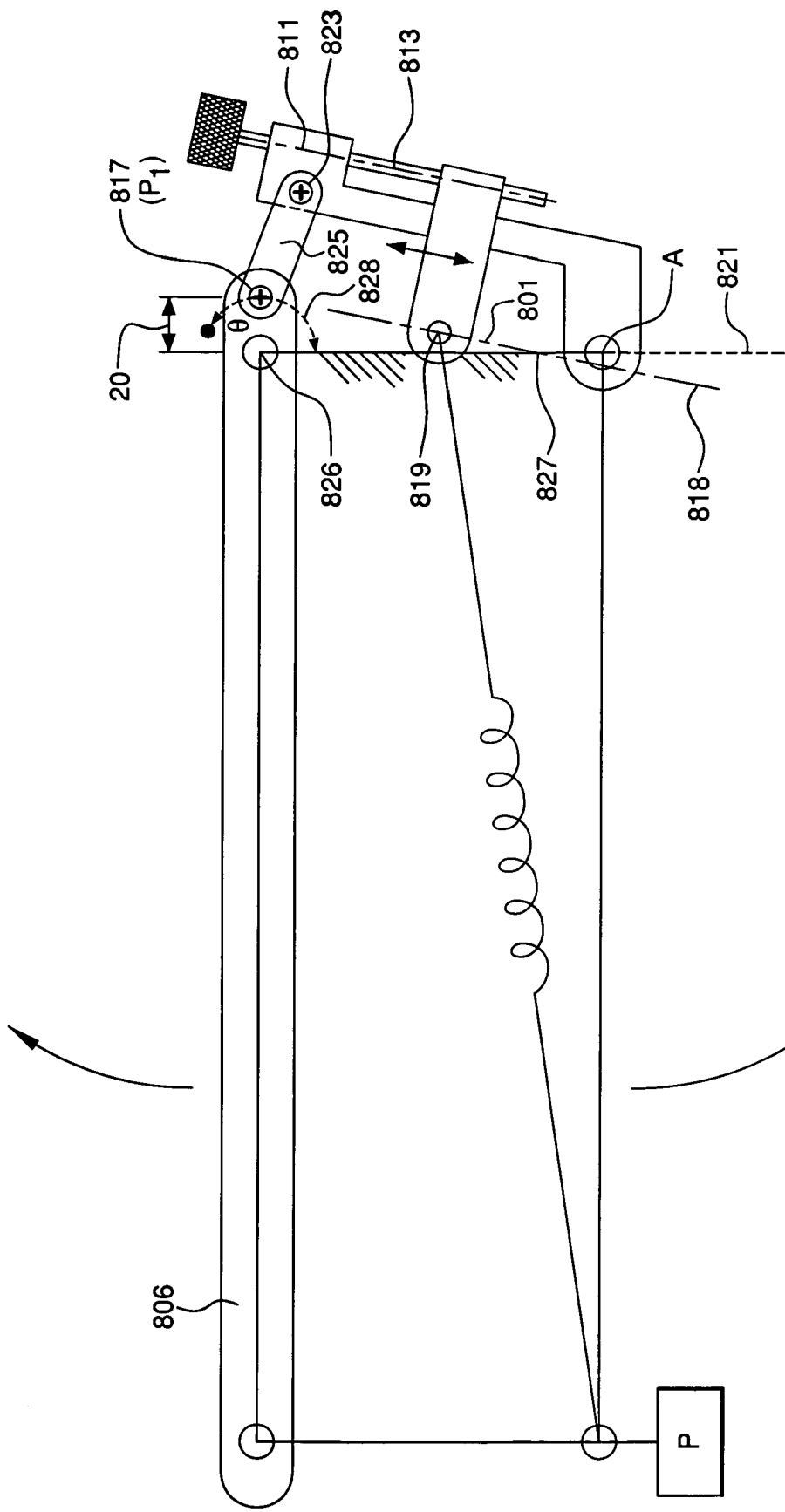
FIGS. 8a-b diagram the substitution of a crank linkage (with its pivot offset) to produce the effect of a circular cam to dynamically alter DX in response to motion of the parallelogram (also proportional to the height of DY) according to an illustrative embodiment of the invention.

FIG. 8a diagrams another illustrative embodiment of the present invention which, substitutes for the cam of FIGS. 6 and 7, a crank linkage 825 with its wrist pin pivot 817 fixedly offset on an extension of link 806, at distance 20 from link pivot 826. Movement of parallelogram link 806 around pivot 826 between high and low values of angle Ø moves crank pivot 817 through arcuate path 828, and thus crank 825, acting through outboard crank pivot 823, moves block 811 to produce an effect similar to that of the circular cam and follower of FIGS. 6 and 7 and likewise dynamically alters the Dx offset of spring termination 819 with respect to 821 in response to the excursion of the parallelogram. As with the cam configuration, the motion created by the crank linkage can be eccentric. Note that this alteration is likewise arcuate around pivot point A and is proportional to the height of side 801 (Dy). In the preferred embodiment illustrated, note that spring termination path 818 does not pass through point A. Spring termination path 818 crosses over line 821 at crossover point 827. This provides that as Dy distance 1 is reduced by means of lead screw 813, the nominal Dx values will become negative before Dy is zero, at roughly the point that the chosen spring rate would have equipoised a diminished load P according to the above-stated formula (K=P/Dy). The higher the spring rate, the more the offset varies toward the 'outside' of the plumb line that is approximated by the substantially vertical leg of the parallelogram linkage.

Figure 8B:
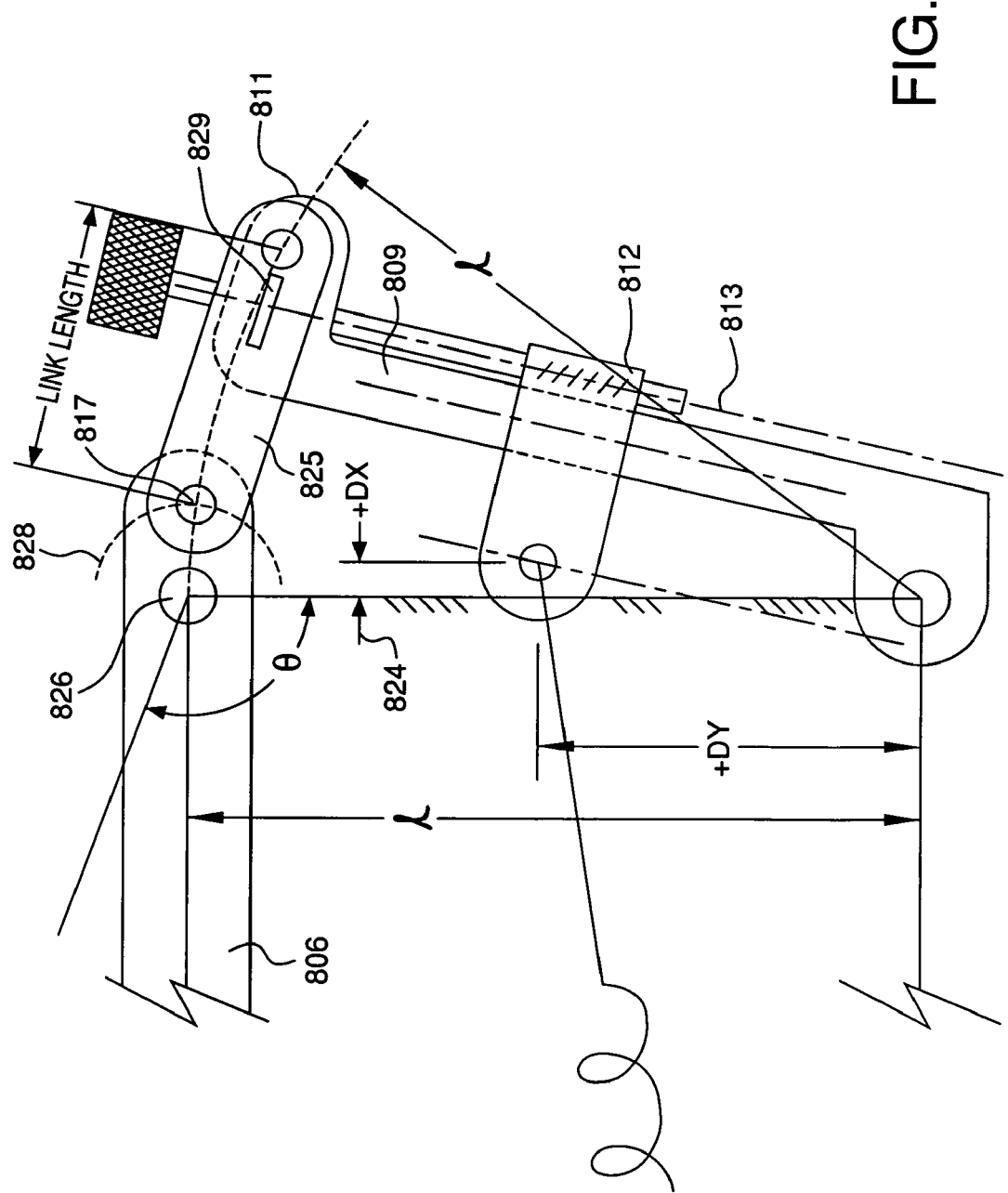

FIG. 8b shows a closer detail of the illustrative embodiment of FIG. 8a, illustrating that captive nut 829 within top bearing block 811 fixes lead screw 813 longitudinally so that it may adjust the position of carrier 812 and its enclosed bearing along lead screw 813. Dx offset distance 824 is momentarily altered by the circular excursion of pivot 817 through path 828 around pivot 826 as the position of link 806 moves between low and high values of angle Ø and actively causes crank 825 to pivotally vary the angle of bearing shaft 809 about point A. The resulting momentary variation in offset 824 is also proportional to the adjustably fixed height of side 1 (Dy).

Figure 9:
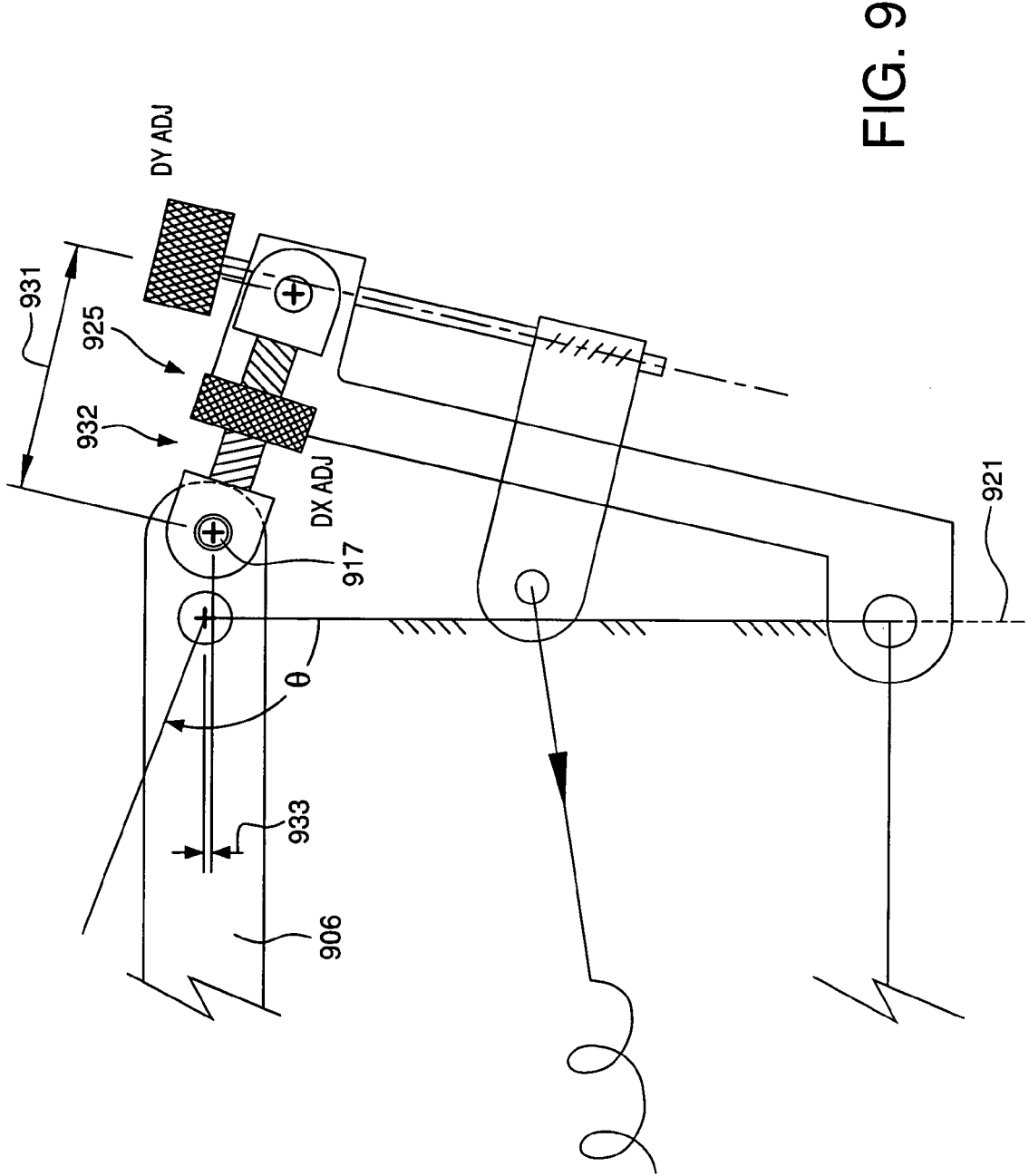
FIG. 9 diagrammatically illustrates the substitution of an adjustable turnbuckle for the fixed crankshaft according to an illustrative embodiment of the invention.

FIG. 9 diagrammatically illustrates an embodiment of the present invention, in which the crank of FIGS. 8a-b is replaced by a turnbuckle assembly of variable length. Shortening the turnbuckle 932, has a twofold effect: it reduces the Dx value and at the same time causes the cam effect of the crank linkage comprising the turnbuckle 932 to become more radical at the high and low extremes of angular motion of the parallelogram in angle Ø. In another embodiment of the invention, fixedly raising or lowering the turnbuckle link pivot 917 with respect to the centerline of link 906 produces offset distance 933 between pivot 917 and the center line of link 906 that respectively causes the 'cam' effect to be more or less radical as Ø decreases and increases. For example, lowering the pivot 917 produces a negative offset distance 933 that decreases the 'cam' effect as Ø decreases and vice versa. Length 931 of crank linkage 925 controls offset Dx (w/respect to line 921). Increasing the length creates a more oblique lifting triangle, while shortening the length causes it to be less oblique. It is noted that other threaded adjustment mechanisms are within the spirit and scope of the invention.

Figure 10A:
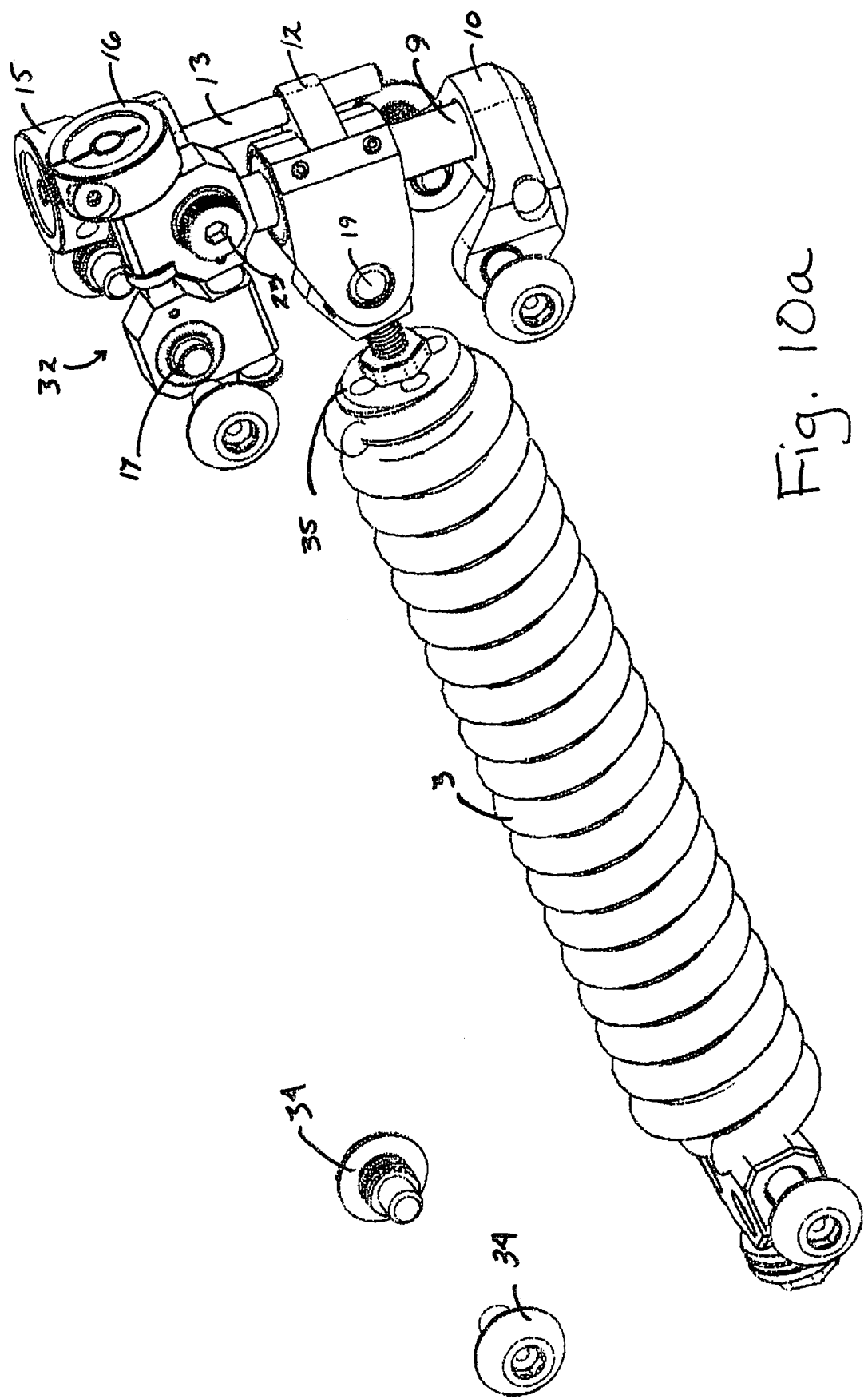

FIG. 10a is a partial isometric view of the mechanism of the preferred embodiment of FIG. 9, illustrating the spatial positions of the trunnion screws 34 that define the parallelogram pivot positions. Spring 3 with terminal 35 and associated hardware terminates at pivot 19 on carrier 12 which rides up and down linear bearing shaft 9 in response to adjustment of lead screw 13 by knob 15. Turnbuckle assembly 32 is expanded or collapsed by knob 16 which draws pivots 17 and 23 together or apart and performs the function diagrammed in FIG. 9 to pivot bottom bearing block 10 and arcuately adjust point 19 in response to the excursion of the parallelogram link 6 (not shown), and proportionate to the height of carrier 12. Note that the turnbuckle assembly 32 provides for the pivots to be closer together than possible with conventional turnbuckles and the adjusting knob 16 can be displaced away from the line between the pivots 17 and 23, and thus out of the way of the end block (not shown) as employed in embodiments of the invention.

FIG. 10b is an alternative angle of an isometric view of the mechanism of FIG. 10a showing the use of a loop end spring 3 extending from axle 36 to spring link 37 which in turn is pivotally linked to carrier 12 which contains linear bearing 9a. This view more clearly shows top bearing block 11 which forms the upper attachment of linear bearing shaft 9, and also illustrates the approximate centerline 47 of pivot 17 for turnbuckle assembly 32.

Figure 11:
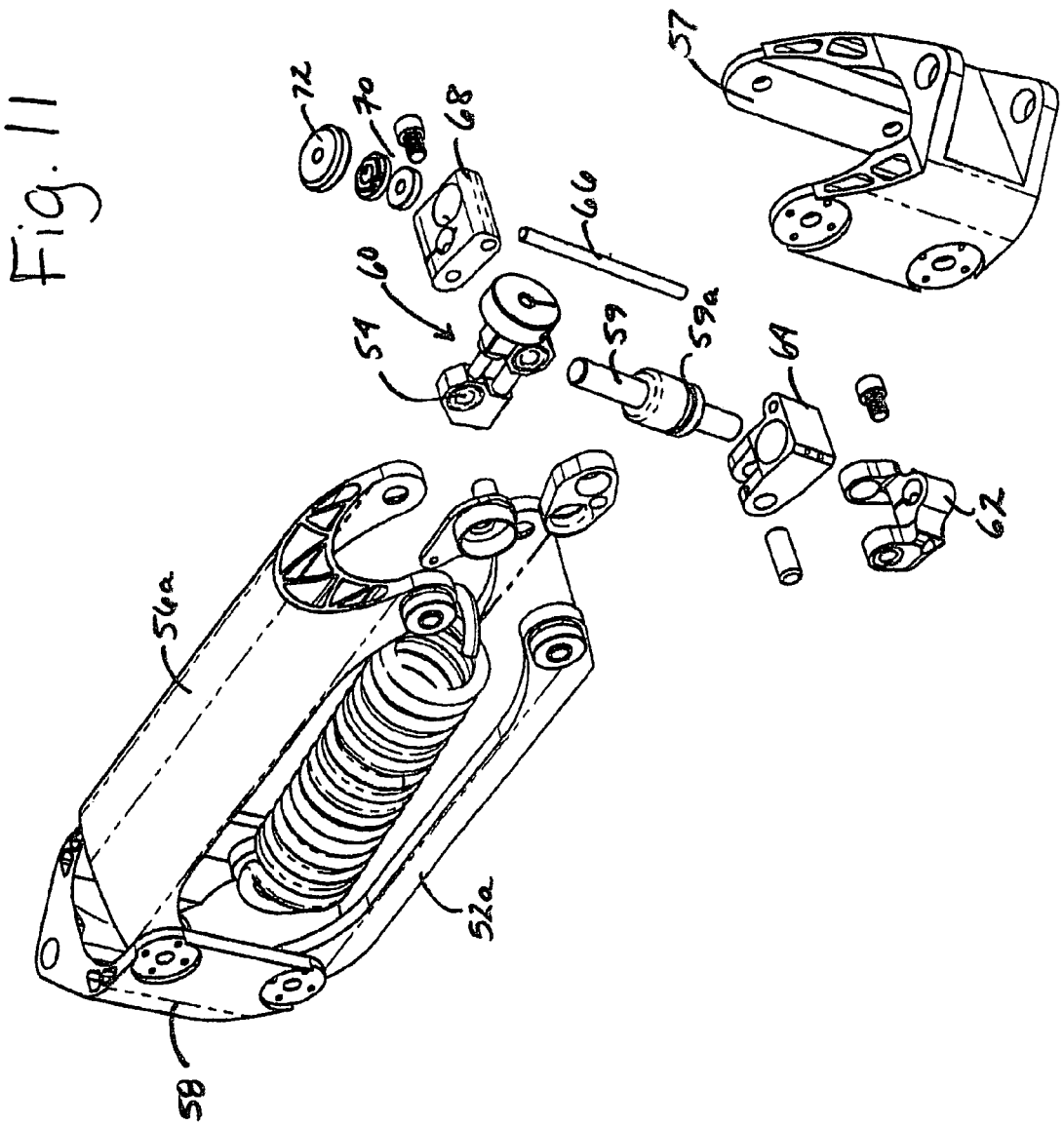
FIG. 11 is an exploded isometric assembly drawing of the mechanism of a single complete arm segment of an illustrative embodiment of the invention.

FIG. 11 is an exploded isometric assembly drawing of the mechanism of a single complete arm segment of the preferred embodiment of the present invention, which illustrates the components of the Dx/Dy adjusting and dynamically moving assembly. End block 58 is pivotally attached to links 52a and 56a. Link 56a provides attachment to pivot 54 which engages the turnbuckle assembly 60. Bottom bearing block 62 engages bearing shaft 59. Carrier 64 encloses bearing 59a and is driven along shaft 59 by lead screw 66, which is longitudinally fixed within top bearing block 68 by captive nut 70 and which is turned by knob 72. End block 57 completes a parallelogram.

Figure 12:
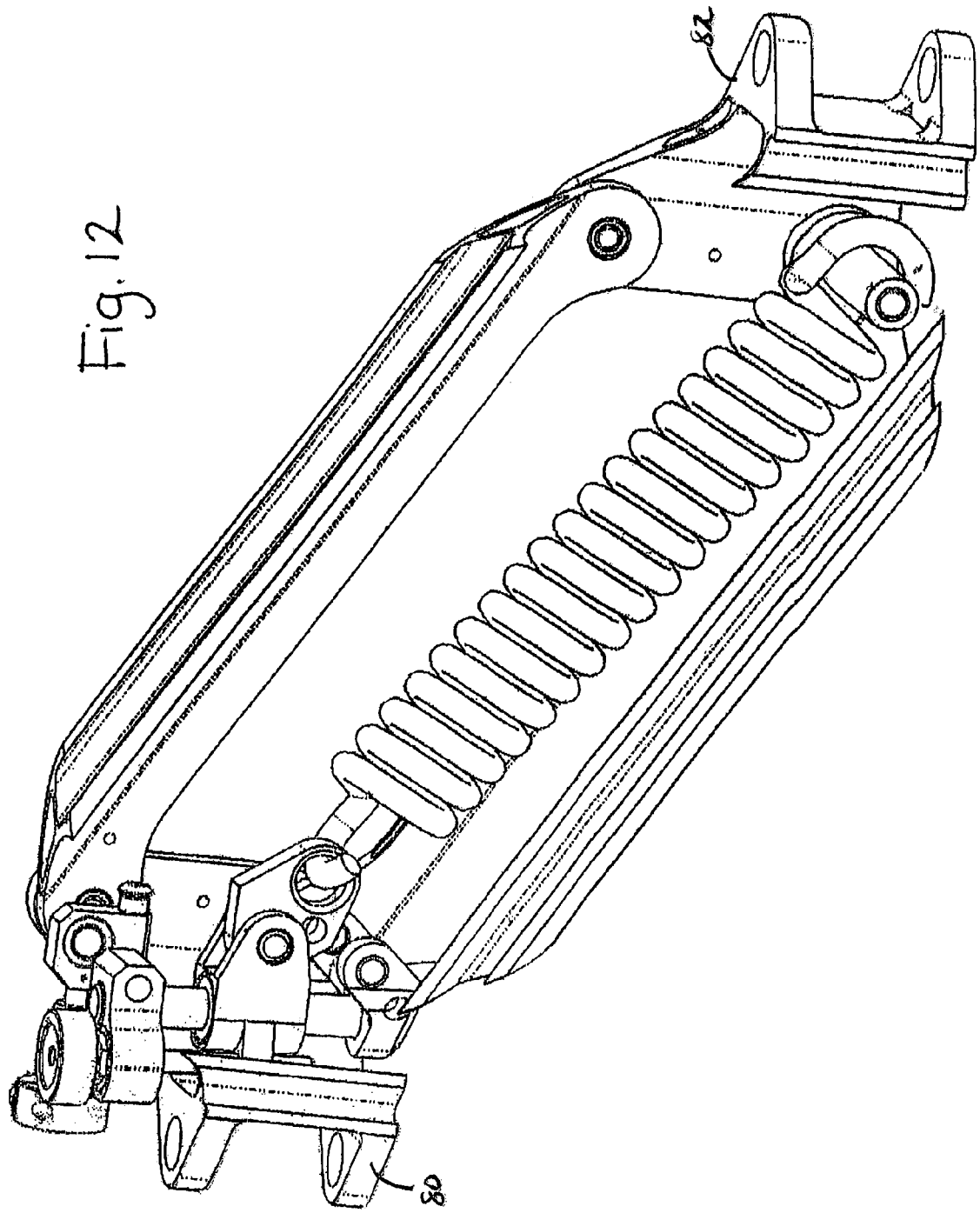
FIG. 12 is a cutaway side view of an arm segment of an illustrative embodiment of the invention showing the vertical pivot attachments for mounting the arm to an operator on the left and to a camera (or to a second arm segment) on the right.

FIG. 12 is a cutaway side view of a single arm segment of a preferred embodiment of the invention showing the pivot locations for mounting the arm segment to a supporting body and payload via end blocks 80 and 82, respectively, if the arm is deployed in the attitude shown, and to end blocks 82 and 80, respectively, if the arm is deployed inverted (not shown) which is an equally valid configuration. Note that a second arm segment can optionally be included, via a hinge (not shown), between one of the end blocks and either the support body or camera (neither is shown) as appropriate. (see FIG. 15)

Figure 13:
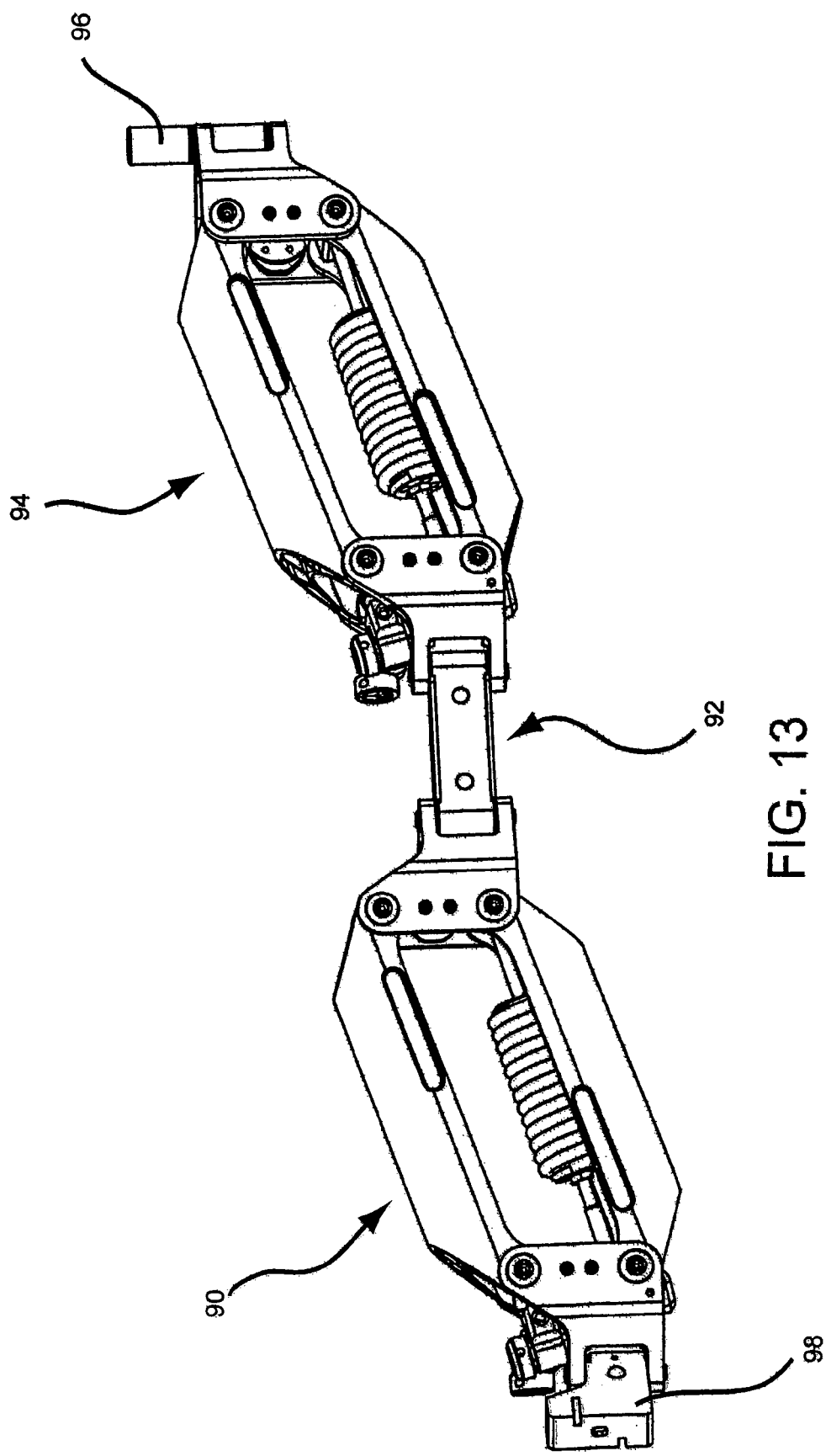
FIG. 13 is a solid side representation of a support arm according to an illustrative embodiment of the invention.

FIG. 13 is a solid side representation of the complete, two-segment support arm of a preferred embodiment of the present invention. Support body (not shown) mounting hardware 98 is pivotally attached to 'upper' arm segment 90, which is pivotally attached via hinge 92 to 'forearm' segment 94, which is adapted for connection to the payload (such as a camera) using post 96. Note that if the arm were inverted, post 96 and body mounting hardware 98 could simply be interchanged and the arm would lift appropriately.

Figure 14A:
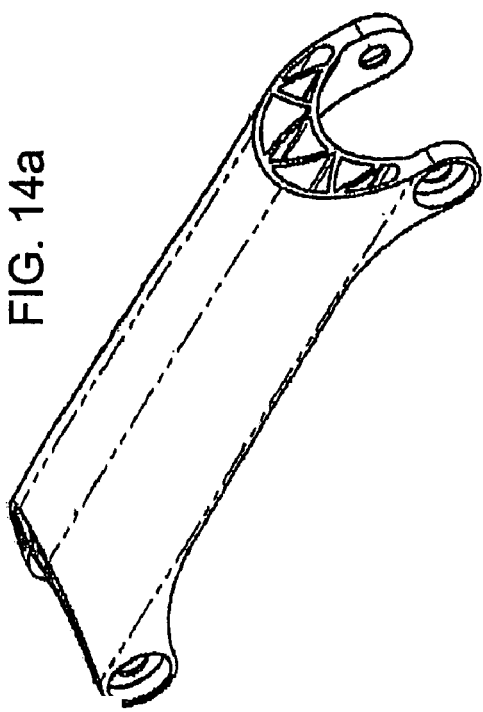
FIGS. 14a-c provide three views of a chambered extrusion formed into a parallelogram support arm link according to an illustrative embodiment of the invention.
Figure 14B:
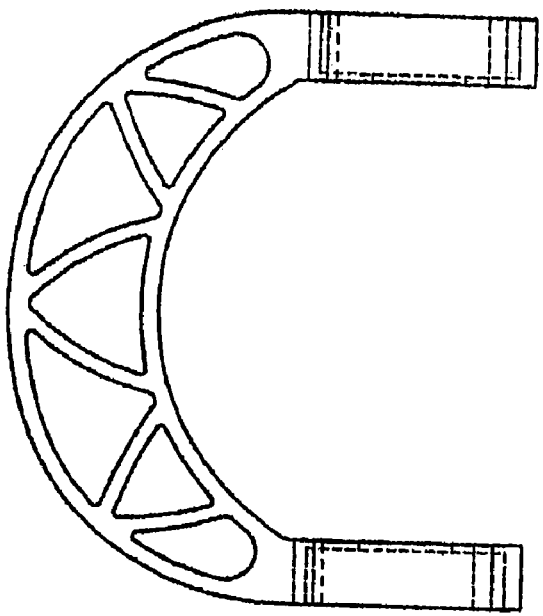
Figure 14C:
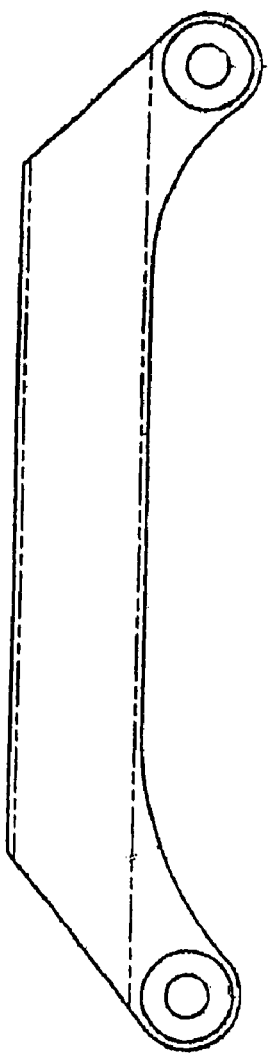

FIG. 14a-c display three views of a chambered extrusion formed into parallelogram support arm links to provide a light, torsionally rigid member. FIG. 14a is a perspective view and shows a solid outer surface, however, openings can exist on the surface. FIG. 14c shows an end view of the extruded chambers, which are roughly triangular in section in this embodiment, and which run the length of the parallelogram link as shown in the isometric view of FIG. 14b.

Figure 15A:
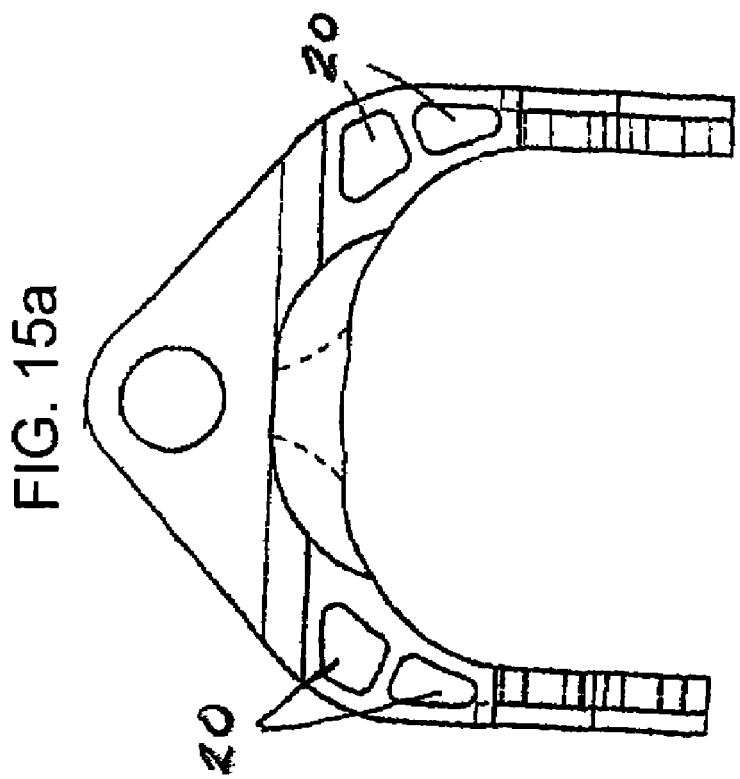
FIGS. 15a-b depict three views of a chambered extrusion formed into a parallelogram support arm end block according to an illustrative embodiment of the invention.
Figure 15B:
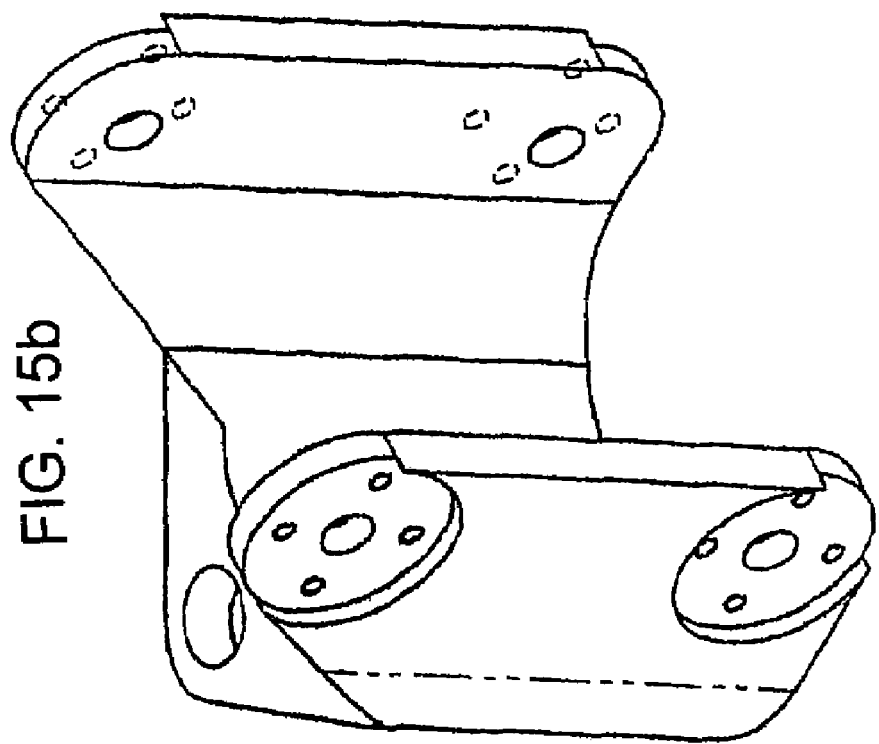

FIGS. 15a-b show views of a chambered extrusion formed into the parallelogram end blocks of an illustrative embodiment. FIG. 15b shows a top view of the end block having chambered voids 20, which provide lightweight and torsional stiffness. The isometric view in FIG. 15a illustrates the extrusion formed into one of the end blocks of the preferred embodiment, yet does not display any of voids 20.

Figure 16:
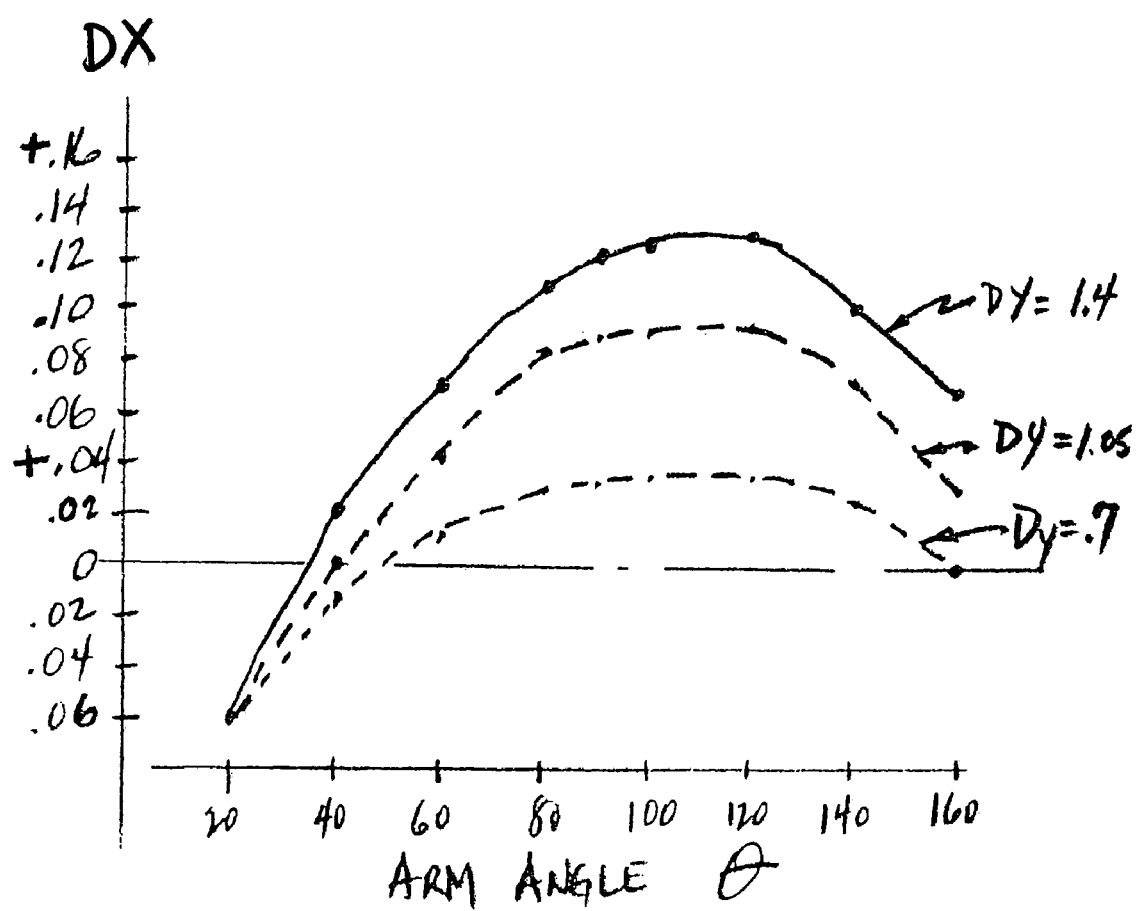
FIG. 16 plots Dx values (at three values of Dy) against a range of angles Ø of parallelogram motion, from 20° to 160° and graphs the parabolic nature of Dx travel according to an illustrative embodiment of the invention.

FIG. 16 plots Dx values (at three values of Dy) against a range of angles Ø of parallelogram motion, from 20° to 160° and graphs the parabolic nature of Dx travel when Dx is varied by the crank linkage of the support arm embodiment of FIGS. 8 and 9.

The desired force exerting device specifications will depend at least in part on the materials and components used and the load supported by the device. These parameters must be balanced with various specifications such as cam shapes, crank axle offsets, crank lengths, spring rates and load lengths for optimum equipoised motion.

FIG. 17 diagrams the results of a graphical solution based on the following formulas:

$$DX = {}^{31}0.95(\alpha)^2 + 0.332(\alpha) - 0.156 \quad (1)$$

$$D = SQRT[(DX)^2 + (DY)^2] \quad (2)$$

$$S = SQRT[(l \sin \alpha + DX)^2 + (l \cos \alpha + DY)^2] \quad (3)$$

$$S1 = (l^2 - D^2 + S^2)/2S \quad (4)$$

$$H = SQRT[l^2 - (S1)^2] \quad (5)$$

$$\text{If } \Sigma M_a = 0, P = ((F)(H) - (W/2) \, l \sin \alpha)/l \sin \alpha \quad (6)$$

Wherein
P: Payload
DX, DY: Define a location for spring attachment
S: is the extended spring length
H: is a line perpendicular to S
α: is the arm angle
F: is the spring force=κ(Δs)+Initial Force
M: moment about point a.

The parabolic function as described above produces regular lift. The crank effectively applies a reverse parabolic function to linearize it. Therefore, if a zero offset is selected, the 'ride' will be hard and non-iso-elastic. (at ±70° with no offset one must lift 10 lbs or push down with 8). With appropriate offset and 'geo' curve mere ounces suffice at both ends with a single high-rate spring that fits into the diagonal of the lifting triangle.

If a nominally appropriate offset position is selected but no 'cam' effect is used, the ride will be softer, but as nominal Dx increases, at some point the arm lifting force will be excessive at the top and insufficient at the bottom of range and the arm will be impelled over centers at both the top and bottom. At this time the lifting curve will favor a point just above center so the arm will leap up to that 'spring-level' point and be sluggish for the next 30 degrees upward and then will accelerate toward lockup:

According to illustrative embodiments of the invention, the arm's lift can be reduced to zero and indeed sent into the negative (pushing down) by motorizing the Dy lead screw, in order, for example, to facilitate the use of an ultrasound transducer without the need for the operator to supply the downward force. Dx and dynamic adjustments can also be motorized. The Dx lead screw (or turnbuckle) can also be motorized. Both Dy and Dx can be dynamically controlled by a manual means (such as a foot pedal) or by computer, in response to outside stimuli, including the 'feel' to the accompanying hand, or a screen reference, such as the image on an ultrasound display screen. Each of Dy and Dx may be controlled in discrete increments or in a continuous manner.

While the invention has been described by illustrative embodiments, additional advantages and modifications will occur to those skilled in the art. Therefore, the invention in its broader aspects is not limited to specific details shown and described herein. Modifications, for example, to the materials, specific components and their layout, may be made without departing from the spirit and scope of the invention. Accordingly, it is intended that the invention not be limited to the specific illustrative embodiments, but be interpreted within the full spirit and scope of the appended claims and their equivalents.

What is claimed is:
1. A force exerting device comprising:
a load arm pivotable about a load pivot and forming a first side of a force exerting structure;
a resilient member having a first end attached to the load arm and a second end attached to a termination point displaced from the load pivot and forming a second side of the force exerting structure;

a force exerting structure third side extending from the termination point to the load pivot;

a first adjustment mechanism to move the termination point to change the length of the third side of the force exerting structure;

a second adjustment mechanism to move the termination point in a direction other than the direction produced by the first adjustment mechanism, wherein the combination of the two adjustments allows the termination point location to be set on either side of a plumb line passing through the load pivot; and wherein at least one side of the force exerting structure is chambered.

2. The force exerting device of claim 1 comprising a threaded adjustment mechanism to produce at least one of the adjustments.

3. The force exerting device of claim 1 further comprising a pivotal parallelogram wherein the load arm is a side of the parallelogram.

4. The force exerting device of claim 1 further comprising an attachment mechanism to attach the load arm to a movable carrier for operation as a portable device.

5. The force exerting device of claim 4 further comprising the movable carrier attached to the load arm.

6. The force exerting device of claim 1 wherein one or more of the adjustment mechanisms is motorized.

7. The force exerting device of claim 1 wherein one or more of the adjustment mechanisms is manually controlled by a component displaced from the arm.

8. The force exerting device of claim 1 wherein the first and second adjustments are proportional.

9. The force exerting device of claim 1 further comprising a second force exerting device pivotally connected to the first force exerting device.

10. A force exerting device comprising:
a load arm pivotable about a load pivot and forming a first side of a force exerting structure;
a resilient member having a first end attached to the load arm and a second end attached to a termination point displaced from the load pivot and forming a second side of the force exerting structure;
a force exerting structure third side extending from the termination point to the load pivot;
a first adjustment mechanism to move the termination point to change the length of the third side of the force exerting structure;
a second adjustment mechanism to move the termination point in a direction other than the direction produced by the first adjustment mechanism, wherein the combination of the two adjustments allows the termination point location to be set on either side of a plumb line passing through the load pivot; and
wherein one or more of the adjustment mechanisms is motorized.

11. The force exerting device of claim 10 wherein one or more of the adjustment mechanisms is computer controlled.

12. A force exerting device comprising:
a load arm pivotable about a load pivot and forming a first side of a force exerting structure;
a resilient member having a first end attached to the load arm and a second end attached to a termination point displaced from the load pivot and forming a second side of the force exerting structure;
a force exerting structure third side extending from the termination point to the load pivot;

a first adjustment mechanism to move the termination point to change the length of the third side of the force exerting structure;
a second adjustment mechanism to move the termination point in a direction other than the direction produced by the first adjustment mechanism, wherein the combination of the two adjustments allows the termination point location to be set on either side of a plumb line passing through the load pivot;
wherein one or more of the adjustment mechanisms is computer controlled.

13. The force exerting device of claim 12 further comprising a computer programmed to control one or more of the adjustments in response to sensed input.

14. A force exerting device comprising:
a load arm pivotable about a load pivot and forming a first side of a force exerting structure;
a resilient member having a first end attached to the load arm and a second end attached to a termination point displaced from the load pivot and forming a second side of the force exerting structure;
a force exerting structure third side extending from the termination point to the load pivot;
a first adjustment mechanism to move the termination point to change the length of the third side of the force exerting structure;
a second adjustment mechanism to move the termination point in a direction other than the direction produced by the first adjustment mechanism, wherein the combination of the two adjustments allows the termination point location to be set on either side of a plumb line passing through the load pivot; and
wherein one or more of the adjustment mechanisms is manually controlled by a component displaced from the arm.

15. The force exerting device of claim 14 wherein the control component is a foot pedal.

16. A method of exerting forces on equipment comprising:
providing a force exerting device having:
a load arm pivotable about a load pivot and forming a first side of a force exerting structure;
a resilient member having a first end attached to the load arm and a second end attached to a termination point displaced from the load pivot and forming a second side of the force exerting structure;
a third force exerting structure side extending from the termination point to the load pivot;
making a first adjustment of the termination point using a first adjustment mechanism to change the length of the third side of the force exerting structure to change the lifting power of the force exerting structure;
making a second adjustment of the termination point in a direction other than the direction produced by the first adjustment mechanism using a second adjustment mechanism, wherein the combination of the two adjustments allows the termination point location to be set on either side of a plumb line to alter the equipoising contour over at least part of the pivotal excursion of the load arm.
wherein the first and second adjustments are dynamically made by moving the termination point in response to motion of the load arm around the load pivot.

17. The method of claim 16 further comprising:
adjusting the termination point so that the first and second adjustments are proportional.

* * * * *

UNITED STATES PATENT AND TRADEMARK OFFICE
CERTIFICATE OF CORRECTION

PATENT NO.       : 7,618,016 B2                                             Page 1 of 1
APPLICATION NO. : 11/403731
DATED            : November 17, 2009
INVENTOR(S)      : Garrett W. Brown It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Nineteenth Day of October, 2010

David J. Kappos
*Director of the United States Patent and Trademark Office*